United States Patent
Allouche et al.

(10) Patent No.: US 10,924,056 B2
(45) Date of Patent: Feb. 16, 2021

(54) METHOD AND APPARATUS FOR CLEANING SURFACES

(71) Applicants: Henry Ouri Allouche, Omer (IL); Yanir Allouche, Tel Aviv (IL)

(72) Inventors: Henry Ouri Allouche, Omer (IL); Yanir Allouche, Tel Aviv (IL)

(73) Assignee: AIRTOUCH SOLAR LTD., Tel Aviv (IL)

(*) Notice: Subject to any disclaimer, the term of this patent is extended or adjusted under 35 U.S.C. 154(b) by 19 days.

(21) Appl. No.: 16/237,680

(22) Filed: Jan. 1, 2019

(65) Prior Publication Data
US 2019/0214940 A1    Jul. 11, 2019

Related U.S. Application Data

(63) Continuation-in-part of application No. PCT/IL2017/050762, filed on Jul. 7, 2017.
(Continued)

(51) Int. Cl.
*H02S 40/10* (2014.01)
*B08B 1/04* (2006.01)
(Continued)

(52) U.S. Cl.
CPC ............. *H02S 40/10* (2014.12); *B08B 1/008* (2013.01); *B08B 1/04* (2013.01); *B08B 5/02* (2013.01);
(Continued)

(58) Field of Classification Search
CPC ........... B08B 13/00; B08B 1/008; B08B 1/04; B08B 5/02; B08B 7/02; F24S 40/20; H02S 40/10
See application file for complete search history.

(56) References Cited

U.S. PATENT DOCUMENTS 8,500,918 B1    8/2013 Meller
9,080,791 B1    7/2015 Ecoppia
(Continued)

FOREIGN PATENT DOCUMENTS

CN    203972359 U    12/2014
CN    104320067 A    1/2015
(Continued)

OTHER PUBLICATIONS

International Search Report PCT/IN19/50946, dated Jul. 9, 2019.
(Continued)

*Primary Examiner* — Marc Carlson
(74) *Attorney, Agent, or Firm* — Reches Patent

(57) ABSTRACT

A surface cleaning device for cleaning a surface of a solar panel, wherein the surface cleaning device may include: a first dust carrying member; a second dust carrying member; a motor; and a motion delay assembly. The first dust carrying member and the second dust carrying member are coupled to the motor; wherein the motor is configured to cyclically move the first dust carrying member and the second dust carrying member along a path. The motion delay assembly is configured to cyclically introduce a momentarily delay in a progress of the first dust carrying member along the path, while the second dust carrying member contacts the surface thereby reducing a gap between the first dust carrying member and the second dust carrying member and induce air to exit the gap and progress along the surface and remove dust that precedes the second dust carrying member.

33 Claims, 30 Drawing Sheets

Related U.S. Application Data

(60) Provisional application No. 62/359,955, filed on Jul. 8, 2016, provisional application No. 62/627,781, filed on Aug. 2, 2018.

(51) Int. Cl.
   | | | |
   |---|---|---|
   | *B08B 1/00* | (2006.01) | |
   | *B08B 13/00* | (2006.01) | |
   | *B08B 5/02* | (2006.01) | |
   | *F24S 40/20* | (2018.01) | |
   | *B08B 7/02* | (2006.01) | |

(52) U.S. Cl.
   CPC ............... *B08B 7/02* (2013.01); *B08B 13/00* (2013.01); *F24S 40/20* (2018.05)

(56) References Cited

U.S. PATENT DOCUMENTS

| | | | |
|---|---|---|---|
| 2013/0003705 A1 | 2/2013 | Eitelhuber | |
| 2013/0206173 A1* | 8/2013 | Zijlstra | B08B 1/008 134/6 |
| 2016/0144870 A1* | 5/2016 | Eitelhuber | B08B 1/002 104/118 |
| 2017/0179873 A1* | 6/2017 | Eitelhuber | A46B 9/026 |

FOREIGN PATENT DOCUMENTS

| | | | |
|---|---|---|---|
| CN | 204220512 | 3/2015 | |
| JP | 2015150492 | 8/2015 | |
| WO | WO-2012000133 A1 * | 1/2012 | ........... E04G 23/004 |
| WO | 14/001906 | 1/2014 | |
| WO | 2015193732 A2 | 12/2015 | |
| WO | 16/190597 | 12/2016 | |
| WO | 17/034921 | 3/2017 | |
| WO | 2018/008033 A1 | 1/2018 | |

OTHER PUBLICATIONS

Written Opinion PCT/IN19/50946, dated Jul. 9, 2019.
International Search Report PCT/IL2017/050762, dated Oct. 30, 2017.
Written Opinion PCT/IL2017/050762, dated Oct. 30, 2017.

* cited by examiner

Moving, using a motor, a first dust carrying member and a second dust carrying member over the surface. The first and second dust carrying members are affixed to a motor and the moving may include moving the first and second dust carrying members to perform at least one out of collecting dust and pushing dust primarily in a first direction.

310

Momentarily delaying a motion of a first dust carrying member approximately at a point where the first dust carrying member lifts above the surface, and the second dust carrying member is at point where it is configured to at least partially block air passage in a second direction generally opposite to its current direction of movement relative to the surface, while air passage is in the direction of the first dust carrying member is less impeded.

320

Moving a surface cleaning device in relation the surface.

Moving, using a motor, a first dust carrying member and a second dust carrying member over a path. Contacting the surface by the first dust carrying member while progressing at a first direction. Following the contact with the surface, colliding by the first dust carrier with a shaking member thereby removing dust from the first dust carrying member. And partially blocking by the surface cleaning device, the dust removed from the first dust carrying member from progressing at a direction that is opposite to the first direction. 510

Moving a surface cleaning device in relation the surface.

METHOD AND APPARATUS FOR CLEANING SURFACES

CROSS REFERENCE

This application is a continuation in part of PCT patent application PCT/IL2017/050762 international filing date Jul. 7, 2017 that claims priority from U.S. provisional patent 62/359,955 filing date Jul. 8, 2017.

This application claims priority from U.S. provisional patent 62/627,781 filing date Feb. 8, 2018.

FIELD OF THE INVENTION

The present disclosure relates to the field of surface cleaning devices.

BACKGROUND OF THE INVENTION

Dust can be collected on surfaces of different kinds and can adversely affect operation of devices associated with the dust covered surfaces. One example of a surface that can be negatively affected by dust collection is a surface of a photovoltaic ("PV") panel (also referred to as a solar panel).

PV panels are most efficiently utilized in sunny areas.

Manny sunny areas globally suffer mostly from dust. Dust that is collected on the (usually glass), surface of PV panels can reduce the irradiation that hit the silicon layer (of the PV panel) by up to 20%.

Most sunny places are located between the Tropic of Cancer and the Tropic of Capricorn where trackers and roof top net-metering configurations are mostly popular.

In a photovoltaic (PV) array, a plurality of solar panels are mount together adjacent to each and may be mounted on big and long tables.

Single Axes PV trackers and roof top tables are usually small in width and length. For example, a fixed tilt solar table is usually includes between 4-7 row of solar panels by 100-150 panels in series (total of 400-1000 panels per table) while in trackers and in roof tops installations the table can be as small as 1 row by 40 panels (40 panel per table).

Still those small tables suffer a lot from dust coverage, which impact the effective radiation (photon) reaching the panel.

Areas (such as deserts) with high irradiation usually suffer from dust and their solar panels usually require more frequent cleaning procedures which manually are very costly.

Robotic cleaning devices must be used. Nevertheless—using a single robot per a solar panel that includes only 40 panels table (each table) instead of 1000 panels table the economics of the cost benefit is different and can kill the investor interests.

Another factor that influences the PV eco-system is that the system cost decreases as a result of the tariff reduction for KWh (from around 0.4/KWh in 2009 to less than 0.07/KWh in 2016).

This new eco-system favors cleaning devices which can operate autonomously.

Preferably a cleaning system should consume fewer materials and consume less energy while still effectively cleaning.

Some examples of the cleaning device according to the present disclosure can support dry, waterless environment friendly operation, which can be beneficial in desert and dry areas with lack of portable water.

Dust can cause a reduction of up to 20% in yield. PV fields in desert climate also suffer from lack of water and access to water pipe.

There is thus a need for frequent cleaning that makes sense in the new world where the value gain from the cleaning is lower (due to tariff) and the size of the table can be in an order of magnitude smaller.

Some places suffer from dew during night or evening time in one or 2 seasons a year. Cleaning with a dry method, when dew occurs, turns the dust into mud and eliminates the ability to use dry apparatus for cleaning.

In such case a fast cleaning must be supported so that cleaning can be completed during afternoon in a fast way.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6A-6B, 2C and 2D illustrate an example of a surface cleaner at two different points of time during a same cleaning cycle;

FIG. 18 illustrates an example of a surface cleaning device;

FIG. 22 illustrates an example of a method;

DETAILED DESCRIPTION OF THE DRAWINGS

Figure 1:
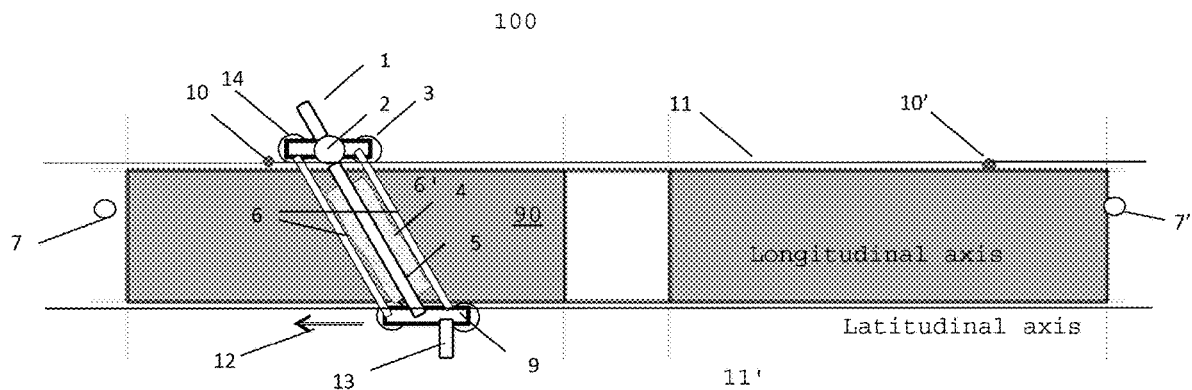
FIG. 1 illustrates an example of a surface cleaner when moving from a right side of a surface to a left side of the surface in diagonal crisscross way.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system or device, unit, mechanism, circuit or apparatus capable of executing the method.

Any reference in the specification to a system, device, unit, mechanism, circuit or apparatus, should be applied mutatis mutandis to a method that may be executed by the system, device, unit, mechanism, circuit or apparatus.

The terms system, device, unit, mechanism, circuit, and apparatus are used in an interchangeable manner.

The terms rod, pipe and axis are used in an interchangeable manner.

Two directions are generally the same (or belong to the same general direction) when they are equal to each other or do not deviate from each other by more than ninety degrees.

The term "substantially"—unless stated otherwise may refer to a deviation of few percent (for example—deviation of less than 10% or less than 20 percent).

The terms "cleaning elements", wipers and "dust carrying members" are used in an interchangeable manner. A dust carrying member is a physical element that is capable of moving dust when contacting the dust during movement (and/or when static). The dust carrying member may absorb or aggregate dust or may not aggregate or absorb dust.

Any combination of any system, device, unit, mechanism, circuit, module or component listed in any of the figures, any part of the specification and/or any claims may be provided. Especially any combination of any claimed feature may be provided.

Any of the surface cleaning device referred to in the specification and/or drawings may perform dry cleaning—without using any fluid to clean the dust or substantially without using fluid to clean the dust. Substantially in this sense means that most of the cleaning process (for example—more than 80% or 90%) is performs by dry cleaning techniques.

The surface cleaning device can employ a single pipe of rotating wipers which may be moved in relation to the surface by a movement mechanism that may include two wagons that drive along the table with or without special rails (Optional—driving directly on the panels).

The surface cleaning device can simplify the process of dry cleaning apparatus to the minimum component, which allows the surface cleaning device to fit the new eco-system of low income and low benefit generated from a clean panels and smaller size of panels' table on roof tops and on single axes tracker.

The surface cleaning device 100 of FIG. 1 may include: (a) a movement mechanism that may include upper wagon 3, lower wagon 9 that have with wheels, (b) a pivot pole 5 (also referred to as axis of rotation) that may be mechanically coupled to the wheels by bearing 2, (c) an engine 13 for moving the lower wagon, (d) a motor 1 for moving the wipers—for example by rotating the pivot pipe, (d) four wipers 4 (may be four rows of wipers) that are mechanically coupled to pivot pipe 5, (e) battery 14, and (f) left shaker pipe 6 and right shaker pipe 6' that are positioned on different sides of the pivot pole 5.

The surface cleaning device 100 is lightweight—and represents a reduction of weight in one order of magnitude from tens of kg (25-90 kg) to less than 5-8 kg. These weights is merely a non-limiting example of the weight of the surface cleaning device. Decreasing the weight of the surface cleaning device allow to reduce the cost of components (such as steel) of the surface cleaning device and allows to reduce any supporting mechanism (such as rails 11) and consume less energy—thus required a lighter energy source.

Optionally, the energy unit for operation of the surface cleaning device can be based on charging a battery through the day by solar panel and activating the engines on energy provided by the battery when cleaning procedure is required.

Figure 7:
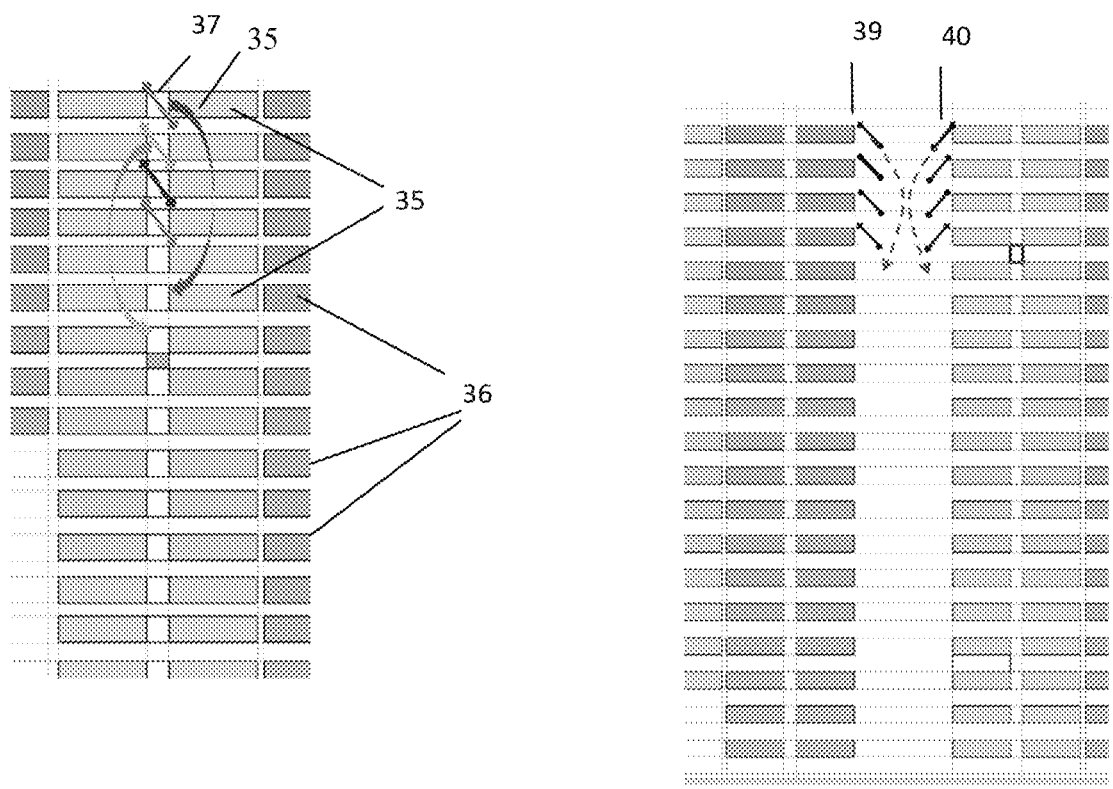
FIG. 7 illustrates an example of a surface cleaner that is moved between surfaces by a drone.
Figure 8:
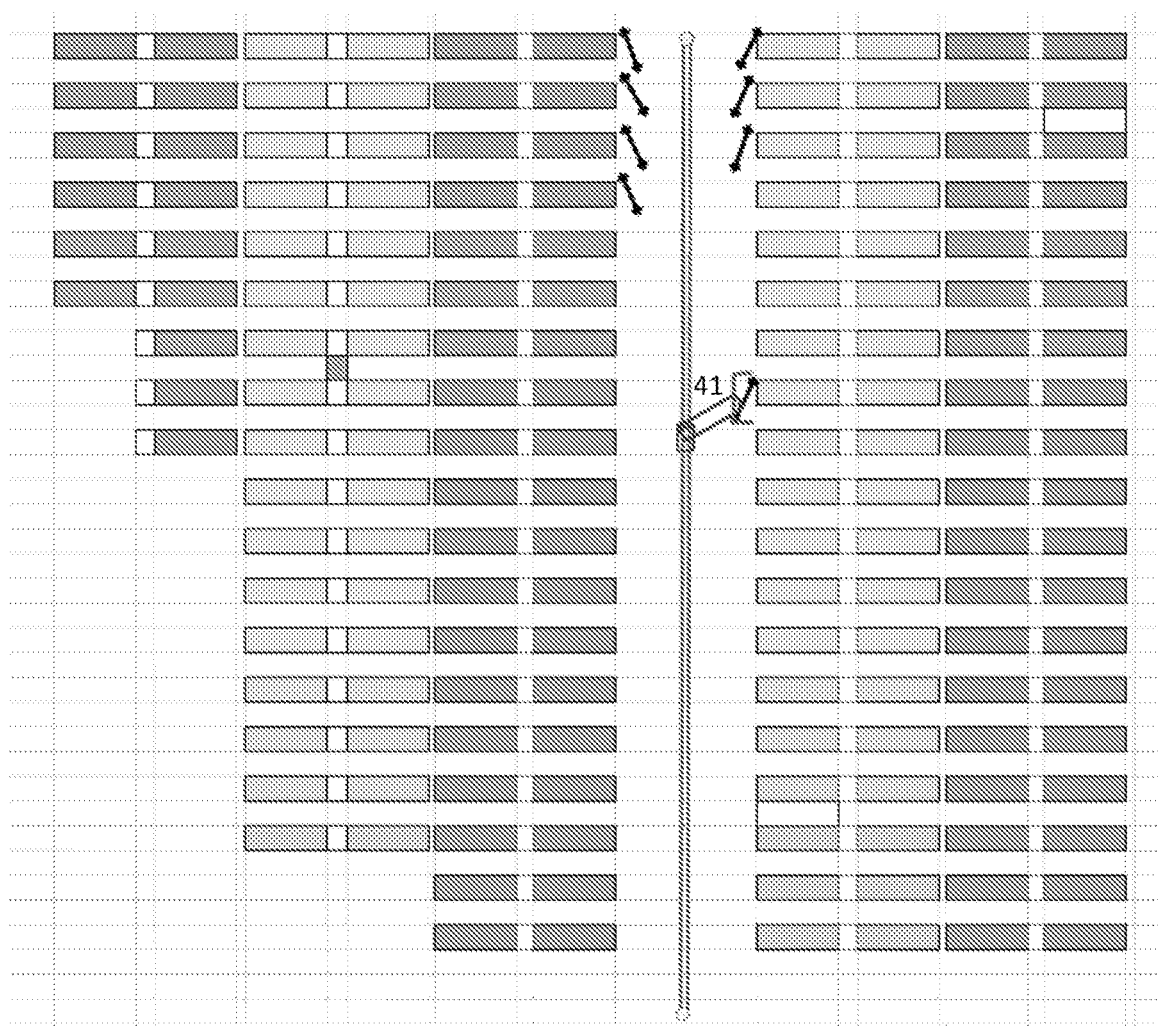
FIG. 8 illustrates an example of a surface cleaner that is moved between surfaces by a robotic arm.

The low weight surface cleaning device may be easily carried from one table to the other by drone or light robotic arm (see FIGS. 7 and 8).

The surface cleaning device may move while being at any angle in relation to the longitudinal axis of the panel. The angle may change over time, may remain the same, may change depending on the tilt angle (in relation to the horizon) of the panel, may change in relation to the direction of movement of the surface cleaning device, may change based on environmental conditions, and the like.

Figure 2:
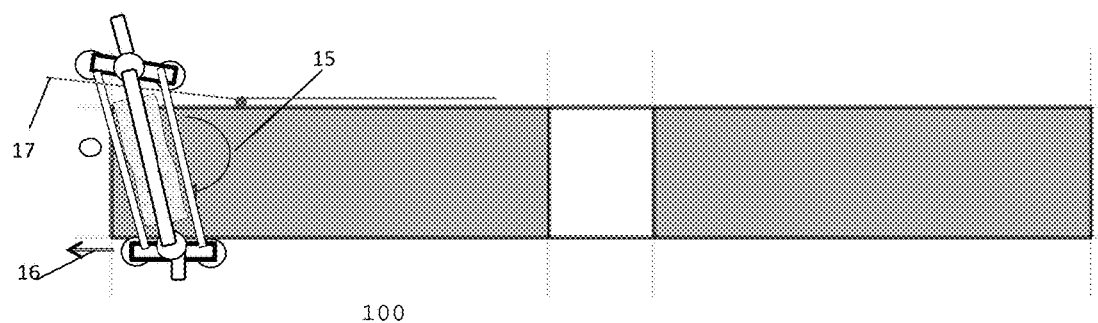
FIG. 2 illustrates an example of a surface cleaner when the cleaning device hits an end of table stopper positioned at the end of the table.
Figure 3:
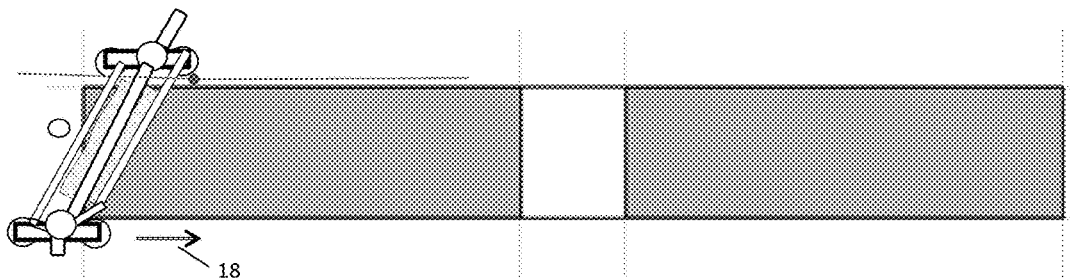
FIG. 3 illustrates an example of a surface cleaner at an end of a turning movement, which change the diagonal direction, this is also the starting position of the surface cleaner while moving toward the right side.

FIGS. 1-3 illustrates the surface cleaning device 100 as moving in a tilted angle (that is not normal to the longitudinal axis of the panel) when progressing towards the left end of the panel and then moving at another tilted angle when progressing towards the right end of the panel.

The movement is referred to as a crisscross diagonal crisscross movement.

In FIGS. 1-3 the upper end of the surface cleaning device precedes the lower end of the surface cleaning device—thereby allowing removed dust to be moved away from the panel. When tilted at such tilt angle dust should not fall back on the surface cleaning device.

Accordingly—the dust removal may benefit from the dust removal operations executed by the surface cleaning device and also benefit from gravity.

In FIG. 1 the surface cleaning device moves toward the left end of the panel (arrow 12 represents this movement) and at least most of the dust that is removed by the surface cleaning device is directed in a general direction that is normal to the tilt angle—and does not come back towards the surface cleaning device.

Assuming that the table is tilted (within a plane that is normal to the plane of FIG. 1) the surface cleaning device removes dust that will fall downwards and not be carried by the surface cleaning device during the entire progress from one end of the table to another end of the table.

Optionally the tilt angle may range between 20-40 degrees from a latitudinal axis of the table. For example, when the tile angle is thirty degrees in relation to the latitudinal axis of the table and the width of the table is 2 meters—dust particles will be carried over less than 2.5 meters (in average). If considering that the tilt of the table is above zero than the wind blowing and gravitation will carry the dust particle along a much shorter way. Other parameters and configurations can be used.

Optionally, the surface cleaning device can improve the air blowing effect, which can help to reduce the scratches impact and reduce the amount of time the surface cleaning device needs to travel for reaching ninety nine percent efficiency of dust removal, due to spraying the dust backward (pick the dust up by the microfiber and sending it backward due to the centrifuge power and hitting the panels surface again with dust particles).

The diagonal movement of the surface cleaning device may be optimized when the motorized mechanism includes only one engine and is configured to push the surface cleaning device for progressing from one end of the panel to another.

Referring to FIGS. 1 and 2—the upper rail 11 and the lower rail 11' extend beyond the left end of the table and beyond the right end of the table.

There is a left pivot 10 that precedes the left end of the table and a right pivot 10 that precedes the right end of the table.

The upper rail 11 may include three segments—left segment, intermediate segment and right segment. These segments are virtually partitioned by left pivot 10 and right pivot 10'—left segment is to the left of left pivot 10, intermediate segment is between left and right pivots and the right segment is to the right of right pivot 10'. The left segment may rotate in relation to the intermediate segment using left pivot 10. The right segment may rotate in relation to the intermediate segment using right pivot 10'. The rotations are required during a change direction process during which the surface cleaning device changes the direction of movement (and cleaning)—from left to right or from right to left.

When the surface cleaning device has to change its movement from a left direction to the right direction the rotation of the left segment enables the change of movement to succeed. The rotation of the left segment is required when the overall length of the surface cleaning device exceeds the distance between the upper and lower rails and thus the distance between the lower segments and the left segment should be changed when changing the direction. The same applies to the right segment.

The motor of the lower wagon 9 pushes the lower wagon to the left 12. Even after an upper part of left stopper 7 contacts a left shaking pipe 6 and prevents upper wagon 3 to progress to the left.

The left stopper 7 may act as a pivot—whereas while the motor of lower wagon 9 continues moving to the left (arrow 16)—the left stopper 7 causes the upper wagon 3 and the upper part of the surface cleaning device to progress to the right.

When the lower wagon reaches a certain position—for example when the lower end of the axis or rotation 5 reaches the left end of the panel—the motor of the lower wagon 9 reverses its rotation direction (or any other mechanical arrangement changes the progress direction of the lower wagon)—and the lower wagon—and the entire surface cleaning device start moving to the right (see arrow 18 of FIG. 3).

Arrow 15 illustrates the reverse of direction and arrow 17 points to the left segment of the upper rail—when positioned at an upmost position.

When the turning movement is completed the left segment of the upper rail returns to its lower position.

The same procedure occurs near the right end of the table—when changing the movement of the surface cleaning device from right to left.

The surface cleaning device when cleaning the surface may generate a dust blowing effect.

Figure 4:
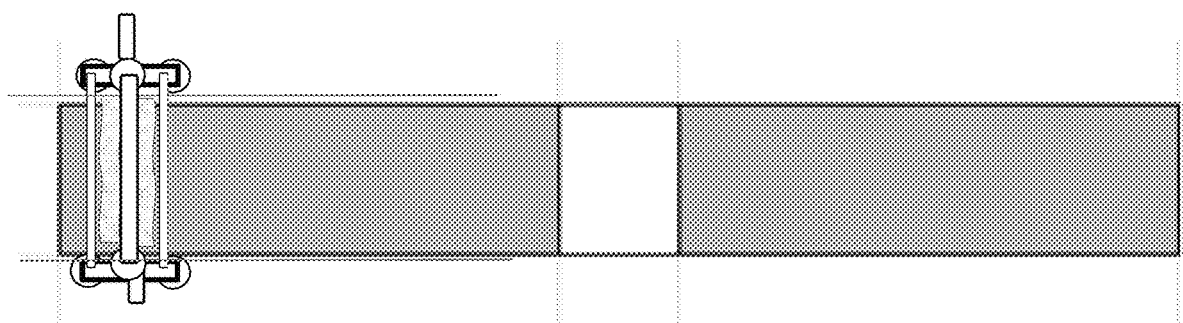
FIG. 4 illustrates an example of a surface cleaner when the surface cleaner is normal to a longitudinal axis of the surface.

FIG. 4 illustrates the surface cleaning device 100 as moving in a non-tilted angle (normal to the longitudinal axis of the panel) when progressing towards the left end of the panel.

FIGS. 1-3 and 5 illustrate a left shaker pipe 6 and right shaker pipe 6'.

When the general cleaning direction is left (and the surface cleaning device cleans the surface while moving to the left) then (a) the left shaker pipe 6 should be "activated" (within the reach or path of the dust carrier members) and the right shaker pipe 6' should be "deactivated" (outside the reach or path of the right shaker pipe 6').

When the general cleaning direction is right (and the surface cleaning device cleans the surface while moving to the right) then (a) the right shaker pipe 6 should be "activated" (within the reach or path of the dust carrier members) and the left shaker pipe 6' should be "deactivated" (outside the reach or path of the left shaker pipe 6').

This selective activation and deactivation may be facilitated in various manners. For example—the right shaker pipe 6' and the left shaker pipe 6 may be moved in and out of reach of the dust carrying members by a manipulator.

There may be a separate manipulator for each one of the right shaker pipe 6' and the left shaker pipe 6. The manipulation may involve any kind of movement—rotation, turning, linear and the like.

Figure 5:
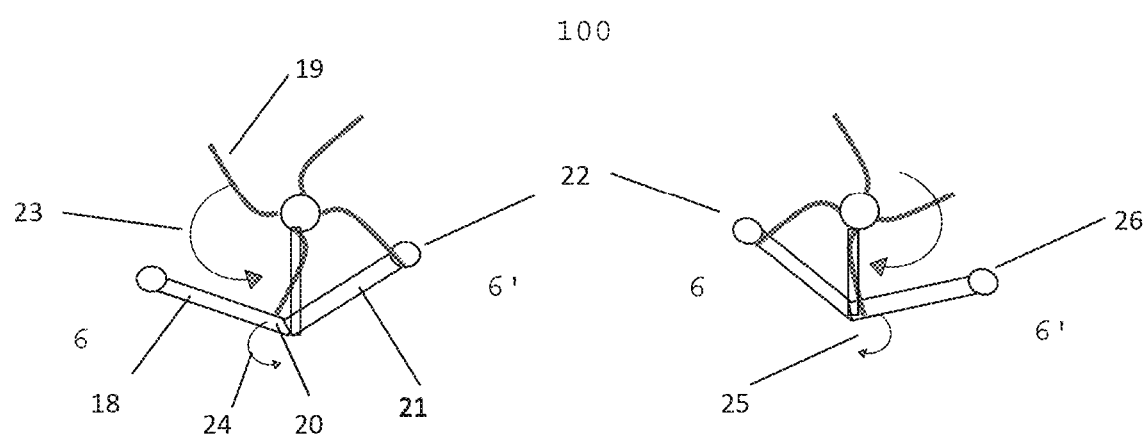
FIG. 5 illustrates an example of a surface cleaner at two different points of time.

In FIG. 5 the manipulator includes a right frame 21 that is connected to the right shaker pipe 6' and a left frame 18 that is connected to the left shaker pipe 6. These frames are rotated by pivot 20 (rotation denoted by arrow 24).

The left part of FIG. 5 illustrates a state where the frames are rotated to the left—the right shaker pipe 6' is activated and the left shaker pipe 6 is deactivated.

The right part of FIG. 5 illustrates a state where the frames are rotated to the right (arrow 25)—the left shaker pipe 6 is activated and the right shaker pipe 6' is deactivated.

The dust carrying member is arranged to direct dust away from the dust carrying member—and prevent (or at least substantially prevent) the dust that it removed from returning backwards.

Accordingly—when a segment of the surface was recently cleaned by the dust carrying member—then the dust carrying member will prevent or substantially prevent duct from returning to that segment.

The dust carrying member may prevent the dust from moving backwards by performing at least one out of dust blowing away from the dust carrying member (especially using air that exits a momentarily compressed gap between the wipers), self-cleaning of the dust carrying members (in front of the dust carrying member), and at least partially blocking the backflow of dust by a wiper that may contact the surface thereby at least partially blocking the back flow of dust.

FIGS. 6A, 6B, 6C and 6D may illustrate different phases is a cleaning cycle. These figures illustrate first dust carrying member 101 and second dust carrying member 102.

Figure 6A:
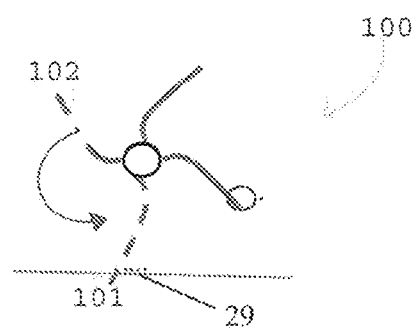

In FIG. 6A the first wiper and second wiper (marked in dashed lines) are fully stretched. The first wiper hits the surface of the panel and grab the dust 28.

When the wiper touches the table surface 29, he cleans the surface and may grab the dust in his fibers.

Figure 6B:
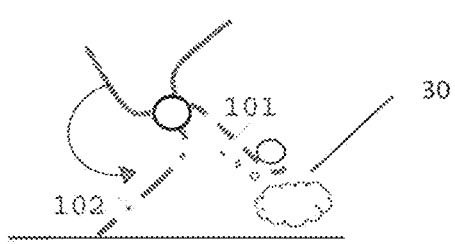

In FIG. 6B the wipers continue their rotation and the first wiper moves toward the right shaking pipe 6'.

The first wiper hits the right shaking pipe 6' thereby removing dust 30 from the first wiper. Moreover, since the right shaking pipe 6' is rounded (compared with the flat surface of the panel 29), the first wiper loops around the right shaking pipe 6', and blocked it from continuing the rotation while the following wiper, continues moving.

Figure 6C:
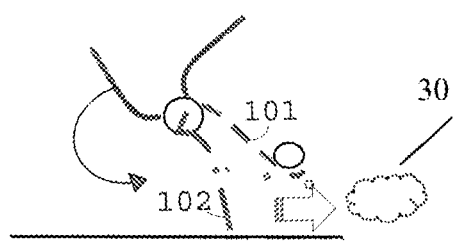

The first wiper progress is delayed in relation to the progress of the following wiper us appear. This causes a compression (at the general direction of cleaning) of the gap between the first wiper and the following wiper. The compression of the gap may be evaluated when comparing the gap that is illustrated in FIG. 6B to the gap (compressed gap) that is illustrated in FIG. 6C. The compression ratio may exceed 1, 2, 3, 4, 5, and the like.

In FIGS. 6B and 6C the following wiper contacts the surface and provide a seal (or a substantial seal) that prevents (or substantially prevents) the flow of air behind the following wiper As in FIG. 6C the following wiper touches the surface and seals the air path backward and the gap (air pocket) between the wipers is compressed—resulting in a relatively significant air blow away from the surface cleaning device.

It should be noted that the first wiper that is wound around the right shaking pipe 6' (or otherwise is contacted by the right shaking pipe) also substantially prevents the air from escaping upwards—and may direct the air that escapes the gap not only forwards but also towards the surface (and the dust that is on the surface).

This air also directs the dust 30 removed from the first wiper (by the right shaking pipe) forwards—away from the surface cleaning device—while preventing (or substantially preventing) dust to flow backwards.

Figure 6D:
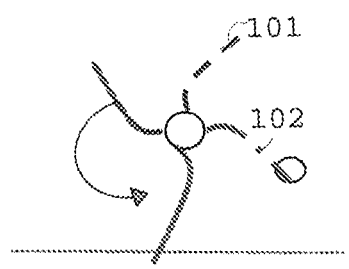

In FIG. 6D the rotation of the wipers continues. The first wiper escapes the right shaking pipe 6' (it is pushed out from the looped position on the right shaker pipe 6') with very small distance between its position and the wiper behind.

Due to the centrifuge power, along its circulation, the first wiper is stretched out and the gap between the first wiper and the preceding wiper increases wipers again, thereby allowing the gap to expand and form an air pocket for the next blowing routine.

The right shaking pipe is positioned at the direction of the movement of the surface cleaning device and increases dramatically the effectiveness of the surface cleaning device as dust that removed from the wiper is blown forwards by a powerful dust blower—without a substantial amount of dust that moves backward.

The principal of the apparatus detail design has many option based on preferred wiper material, type of sand in the specific region, length of the table, but in all cases the apparatus design may or may not be based on few principals that may or may not be implemented.

Shaker pipe height from the table—it may be positioned at an angle of up to 125 degrees (zero is down from the pivot toward the panels surface) to create the dust cloud low enough not to spray the dust backward. This limitation also allows the wiper another 235 degrees of movement, till it hits the panel again to be stretched out using the centrifuge force. Nevertheless—the angle of deviation (125 degrees) is a non-limiting example and the angle may change from 125 degrees.

Wiper length—it may be beneficial to have the wiper loop on the shaking pipes and that the resistance (to backward wind) of the wiper when moving along the surface of the panel is much lower than the resistance (amount of force that will free the wiper) of the looped wiper on the shaking pipe. This allows the air pocket between any adjacent wipers to shrink and generate a significant the wind blowing effect.

Positioning of the following wiper to contact the surface during the looping of the preceding wiper on the shaking pipe. This will provide a backward seal for preventing the air in the gap to flow backwards.

Stretching out process—the end of the wiper may or may not be heavier for smoothing and hurrying the stretching movement of the wiper along the path maximizing the centrifuge force acting on the wipers while circulating.

The material of the wiper can changed but the design should attached to the flexibility and weight of the material.

When implementing at least some of the mentioned above requirements the surface cleaning device may be benefit from:
  a. An increase in the wind speed in the direction of the panel (for example—by a factor of four in comparison to rotating wipers without the shaking pipe).
  b. Prevent dust from be directed backwards.
  c. Facilitate a simple and compact system.

In a proof of concept (as described in the picture below—measurements in cm described in gray color) the surface cleaning device handled 25 gram per square meter dust (represent heavy dust layer generated on extreme sand storm) with wipers that were made of 4200 gsm (gram per square meter) microfiber that were folded into two, and the axis of rotation rotated at a speed of 280 round per minute. This surface cleaning device achieved in one round of cleaning (cleaning while moving to a single direction) a reduction of 99% of dust. In this proof of concept the wagon speed was 5 meters per minute.

In this proof of concept the wipers width (distance from the rotating pipe) were 4.5 cm longer (20 cm) than the distance (15.5 cm) between the rotating pipe and the surface of the solar panel.

Due to the high speed of rotation only the last 2 cm of wiper really touch the glass—is such case the effective wiping surface of each wiper is 5 cm of glass. If each second the rotating pipe performs 4.5 rounds, then overall 18 wiping operations (4 wipers each round) are executed per second and the wagon moves 10 centimeters per second.

This proof of concept illustrated a complete clean (over 99% removal of dust) of 25 gram of dust per square meter of surface (represent a moderate storm), in one round.

Another important device for cost reduction and maintenance reduction is the ability to move the robot between tables.

FIG. 7 describes using a rail and/or a drone and/or a robotic arm for moving the surface cleaning device from one table to the other.

Any system or device that may carry the surface cleaning device may move the surface cleaning device. The carrying of the surface cleaning device is simplified and is cheaper in comparison to other devices due to the light weight of the surface cleaning device.

The left side of FIG. 7 illustrates an array of tables 35 that aligned with adjacent tables 36 and each table and adjacent table are close enough to enable a rail 37 to be connected to different tables of a row and thus the drone and/or robotic arm will move the surface cleaning device between one row to the other.

The right part of FIG. 7 illustrates tables 39 and 40 that are aligned but are spaced apart from each other and may require a drone or a robotic arm to move the surface cleaning device between different tables.

FIG. 8 illustrates a robotic arm 41 that is move the surface cleaning device between tables of the same row that are also spaced apart from each other and between tables of different rows. A road or wide enough path may be formed between the tables and the robotic arm may move along the road.

Figure 9:
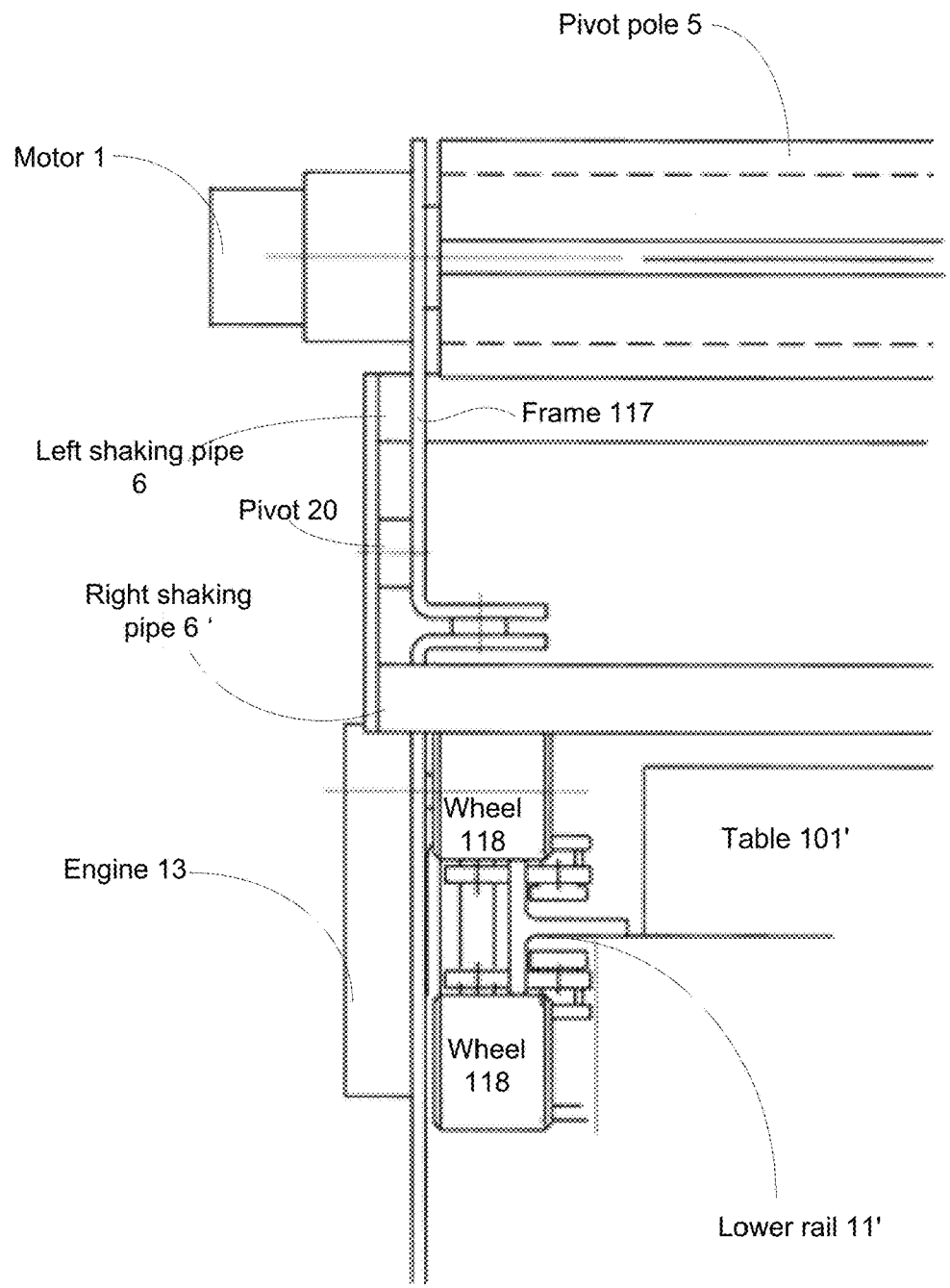
FIG. 9 illustrates an example of a surface cleaning device.

FIG. 9 is a front view of table 101' surface cleaning device 100 that illustrates a lower wagon 9, pivot pole 5 that is rotated by motor 1, a frame 117 that supports the pivot pole 5, left shaking pipe 6, right shaking pipe 6', pivot 20, engine 13, lower rail 11' and wheels 118 of the lower wagon that are positioned at both sides of the lower rail.

Figure 10:
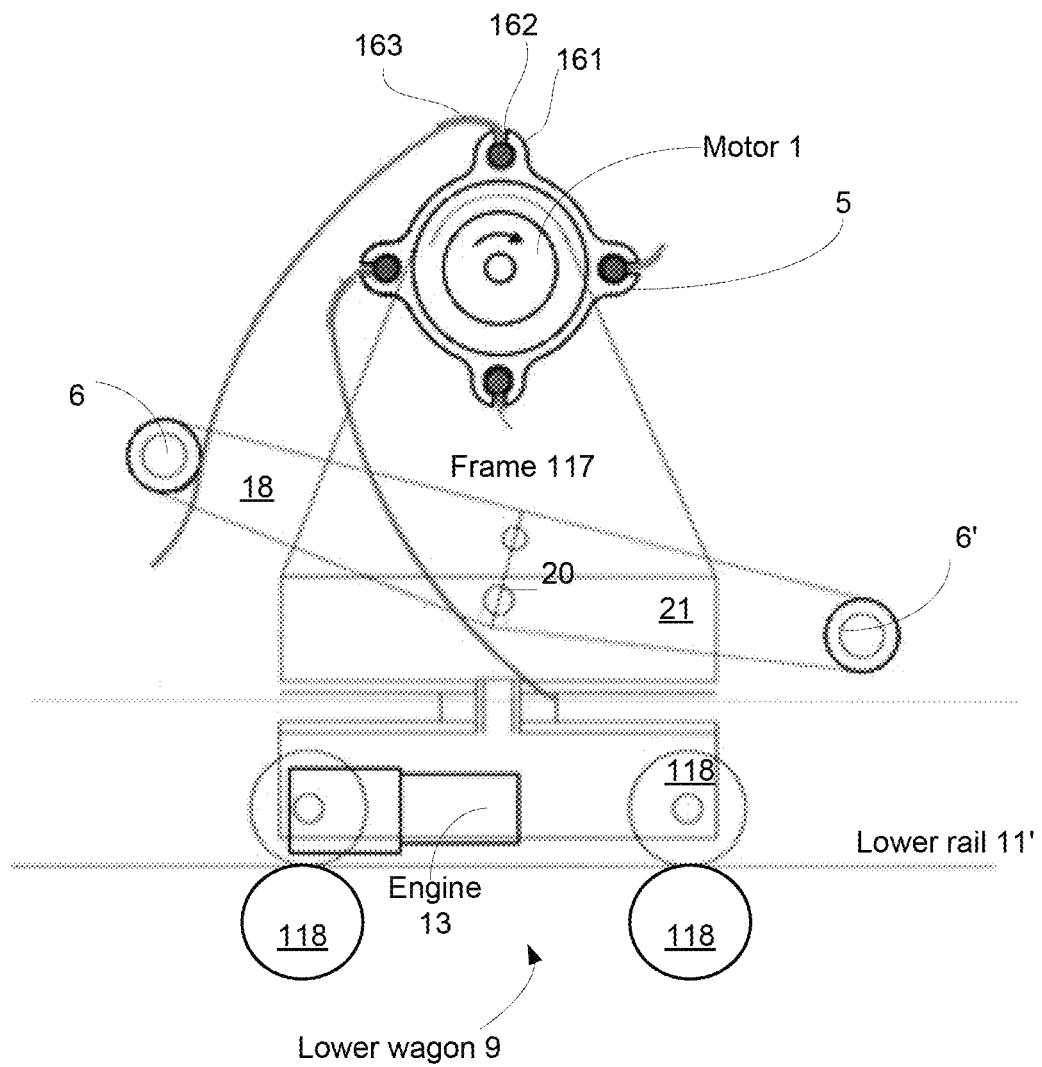
FIG. 10 illustrates an example of a surface cleaning device.

FIG. 10 is a side view of surface cleaning device 100 that illustrates a lower wagon 9, pivot pole 5 that is rotated by motor 1, a frame 117 that supports the pivot pole 5, left shaking pipe 6, right shaking pipe 6', pivot 20, engine 13, left frame 18, right frame 21, lower rail 11' and wheels 118 of the lower wagon that are positioned at both sides of the lower rail.

The pivot pole 5 has holders 161 for holding poles 162 that are attached to the wipers 163.

Figure 11:
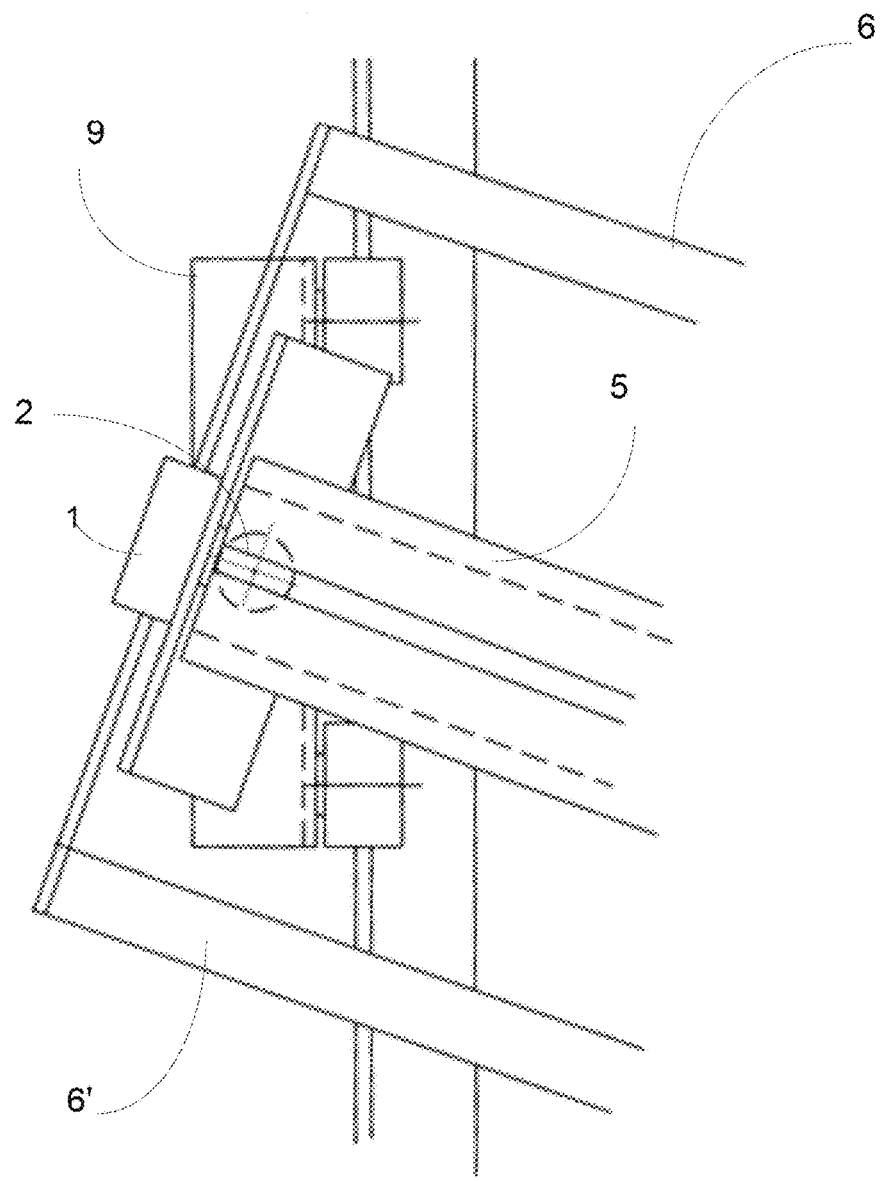
FIG. 11 illustrates an example of a surface cleaning device.

FIG. 11 is a top view that illustrates bearing 2 that allows the pivot pole 5 to rotate in relation to the lower rail, motor 1, left and right shaking pipes 6 and 6', and lower wagon 9.

Figure 12:
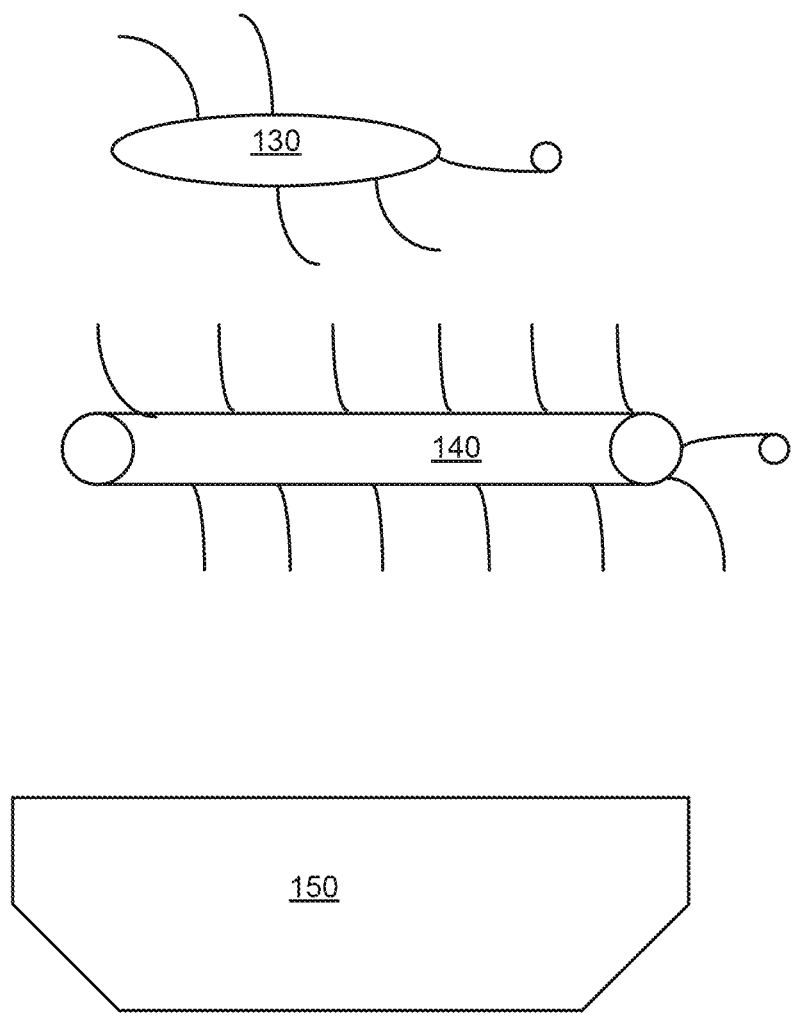
FIG. 12 illustrates an examples of interfacing elements.

FIG. 12 illustrates various wiper interfaces that are not circular. Previous figures illustrated a rotating pole that defined a circular path—it forced the wipers (at least the inner ends of the wipers) to follow a circular path. FIG. 12 illustrates wiper interfaces that are non-circular.

Wiper interface 130 is elliptical, wiper interface 140 approximates a rectangle but has round corners and wiper interface 150 is a polygon. The wiper interfaces may be track or any other interfacing element that may be moved (directly or indirectly) by one or more motors.

Figure 13:
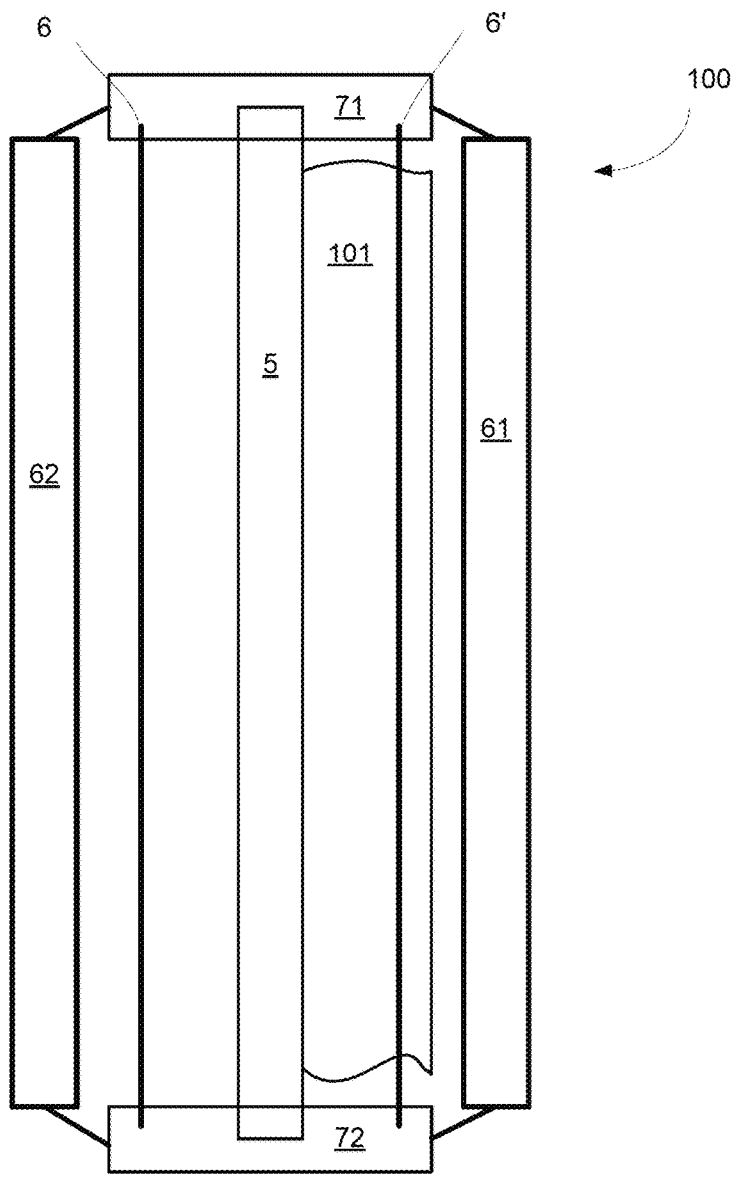
FIG. 13 illustrates an example of a surface cleaning device.

FIG. 13 illustrates surface cleaning device 100 that is powered by solar panels 61 and 62 that are positioned to the left and the right of the pivot pipe 5. The solar panels may be located in any position—and especially outside the reach of the wipers. Alternatively, a solar panel may act as a motion delay element. The solar panels may be positioned above the pivot pole 5.

FIG. 13 also illustrates pivot pole 5, left and right shaking poles 6 and 6' and two movement mechanism units 71 and 72 for moving the surface cleaning device 100. The movement mechanism units 71 and 72 t may be wagons or may differ from wagons.

The number of solar panels may be one, two or exceed two.

Figure 14:
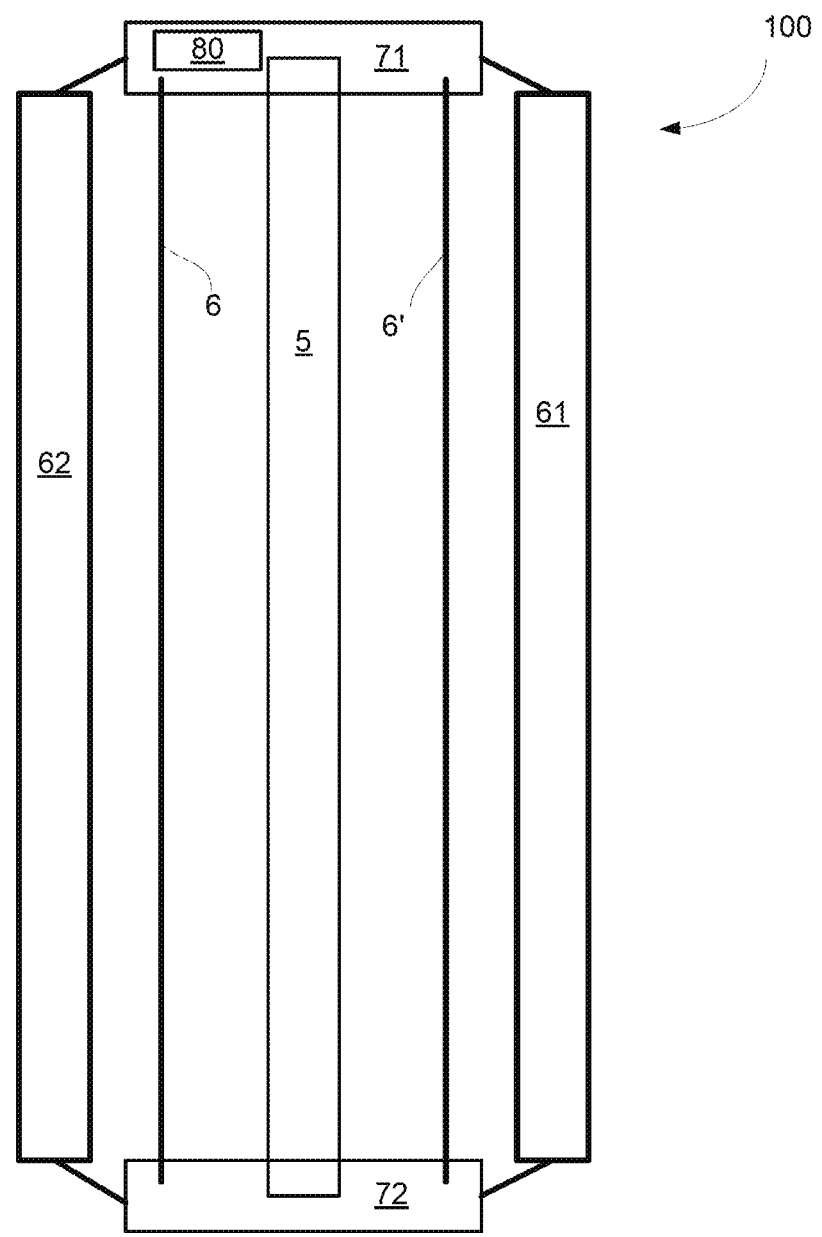
FIG. 14 illustrates an example of a surface cleaning device.

FIG. 14 illustrates surface cleaning device 100 that has a controller 80. The controller 80 may be a hardware controller that may include one or more integrated circuits. The controller 80 may be positioned in any location and may be included in any of the surface cleaning devices 100 of any other figure.

The surface cleaning device 100 may include one or more sensors such as but not limited to (a) at least one environment sensor that is configured to sense at least one environmental condition, and/or (b) at least one state sensor that is configured to sense a state parameter of the surface cleaning device.

The at least one environmental sensor may be a humidity sensor. A rain sensor, a temperature sensor, a wind sensor and a sun radiation sensor.

The at least one state sensor may sense the functionality of various components of the surface cleaning device 100, the energetic state of the surface cleaning device 100— especially whether the surface cleaning device 100 has enough power to complete a scheduled cleaning task.

The wind sensor may sense the speed of the wind and/or the direction of the wind. When the speed of the wind is too high the controller 80 may decide not to perform any cleaning operation for safety reason.

When the wind sensor detects a wind direction the controller may determine not to perform any cleaning operation that attempts to remove dust in a direction that is in the general direction of the wind direction.

The controller may determine not to perform any cleaning operation that attempts to remove dust at a certain direction when (a) the wind speed is a above a certain threshold (significant wind), and (b) the wind direction is in the general direction of the certain direction.

Figure 15:
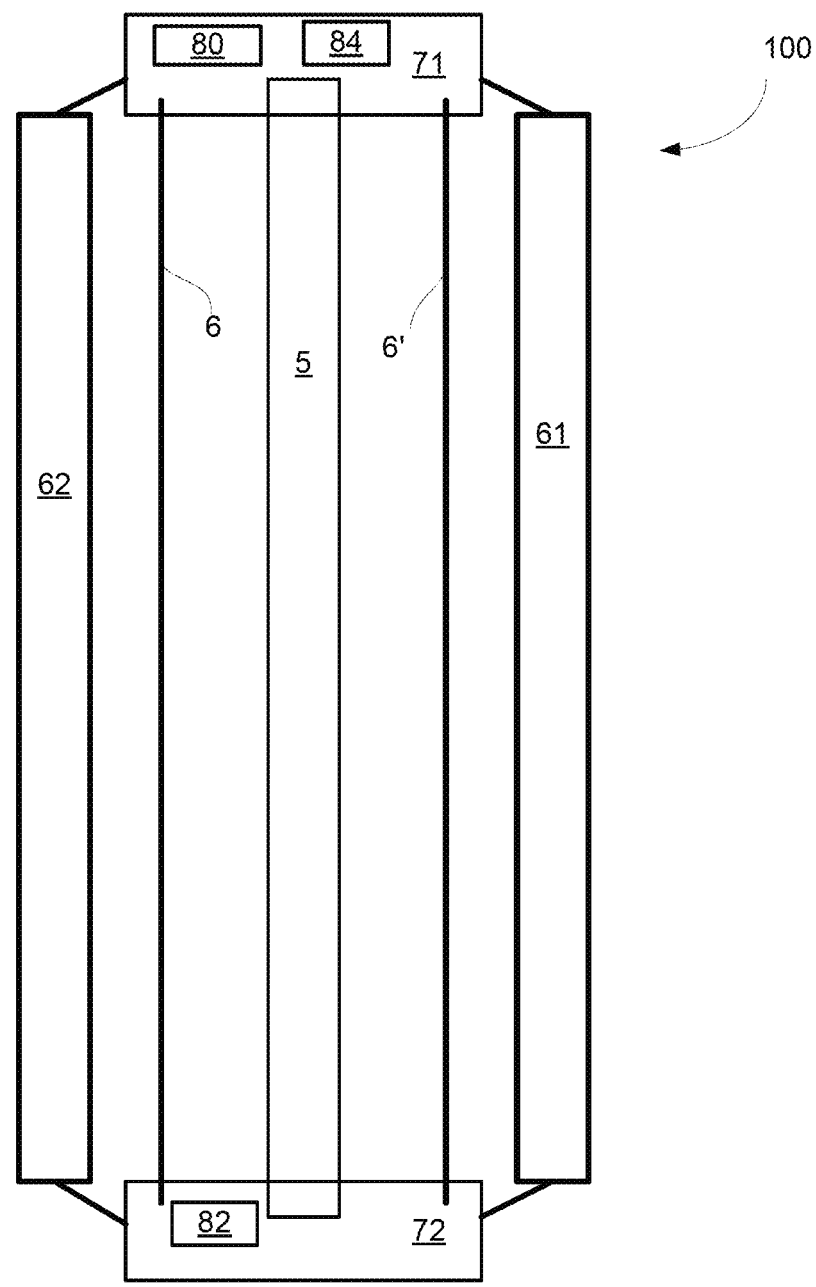
FIG. 15 illustrates an example of a surface cleaning device.
Figure 16:
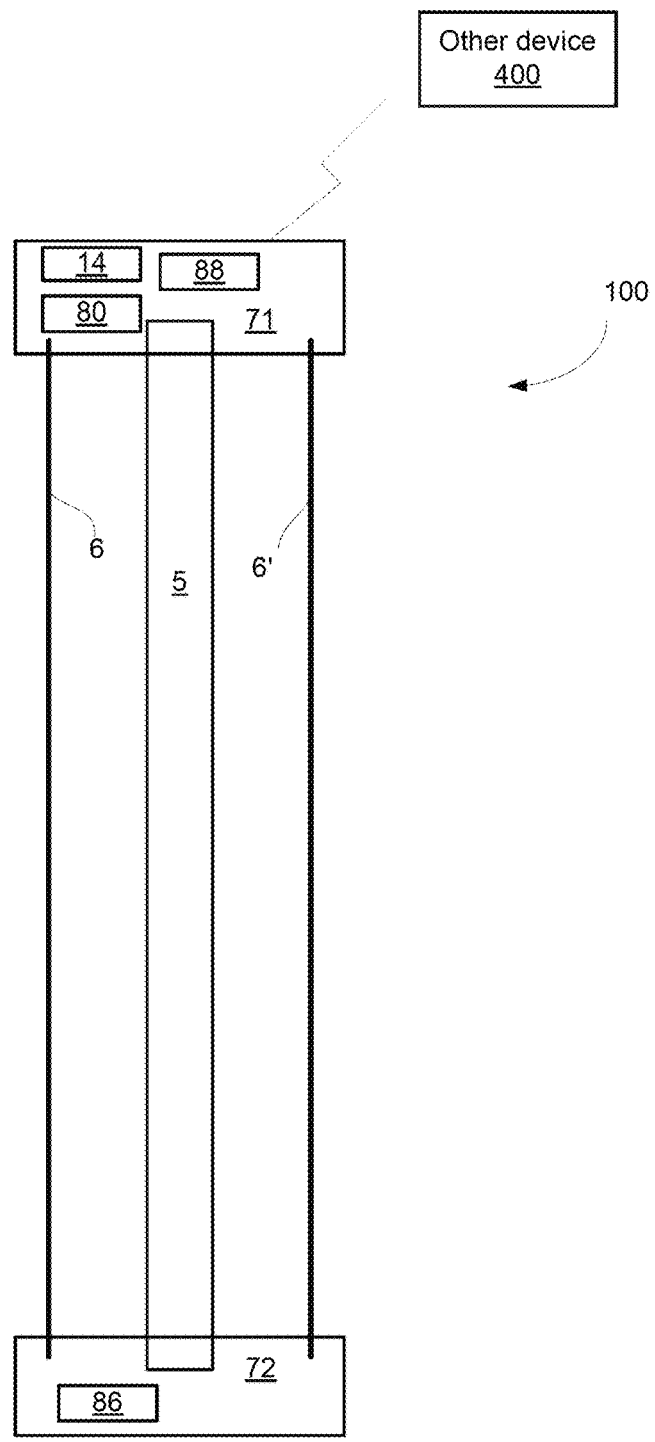
FIG. 16 illustrates an example of a surface cleaning device.

FIGS. 15 and 16 illustrates various sensors 84 and 86. The number of sensors per surface cleaning device 100 may range between zero and at least five. Sensors 84 and 86 may represent any type of sensors—state sensors and/or environmental sensors. FIG. 16 illustrates a communication module 88 of the surface cleaning device in communication with another device 400.

FIG. 16 illustrates surface cleaning device 100 without solar panels but with battery—but the surface cleaning device 100 may include both one or more solar panels and one or more batteries.

Figure 17:
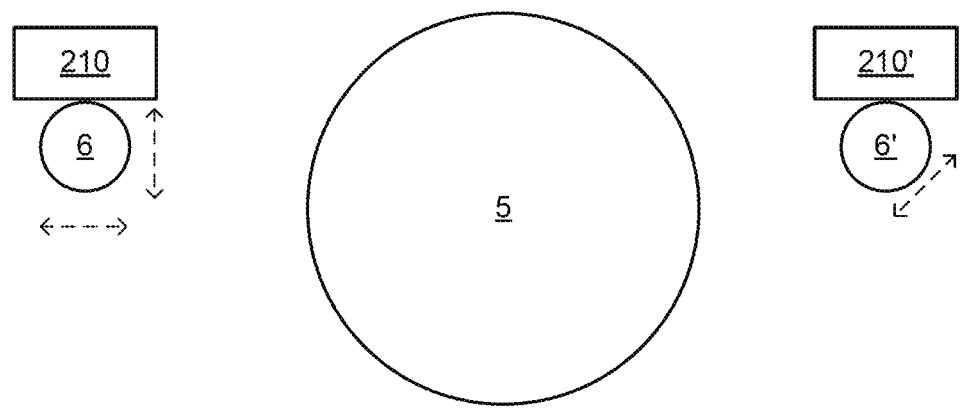
FIG. 17 illustrates an example of a surface cleaning device.

FIG. 17 illustrates that the left and shaking pipes 6 and 6' may be reciprocated by motors 210, 210' (or any other manipulators) by one or more various manners (horizontally, vertically, in a linear and non-linear manner)—or otherwise cyclically moved so as to contact the wipers while moving.

FIG. 18 illustrates method 300 for dry cleaning.

Method 300 may start by steps 310 and 320.

Step 310 may include moving, using a motor, a first dust carrying member and a second dust carrying member over the surface. The first and second dust carrying members are affixed to a motor and step 310 includes moving the first and second dust carrying members to perform at least one out of collecting dust and pushing dust primarily in a first direction.

Step 320 includes momentarily delaying a motion of a first dust carrying member approximately at a point where the first dust carrying member lifts above the surface, and the second dust carrying member is at point where it is configured to at least partially block air passage in a second direction generally opposite to its current direction of movement relative to the surface, while air passage is in the direction of the first dust carrying member is less impeded.

Steps 310 and 320 may be repeated multiple times—during multiple cleaning cycles.

Method 300 may also include step 330 of moving a surface cleaning device in relation the surface.

Step 330 may be executed in parallel to steps 310 and 320.

It should be noted that the wagons are merely a non-limiting example of a movement mechanism units that may move the surface cleaning device.

The surface cleaning device may move on the panel and not on the rails and/or the surface cleaning device may interface with the panel in any other manner.

The pivot pipe and/or the shaking pipes are merely non-limiting examples of shaking elements and/or motion delay elements. The shaking elements and/or motion delay elements may differ from pipes, may be smooth or have a rugger exterior, may have a cross section that is not circular, and the like.

It should be noted that although the various figures illustrate left and right movements that the surface cleaning device 100 may move along any pattern and in any direction. For example—the surface cleaning device 100 may move vertically (up and down), perform a polygon shaped pattern and the like. Different patterns may require to hold to the surface cleaning device 100 to the solar panels in manners that differ from those illustrated above.

The surface cleaning device 100 may operate without a frame that is positioned above the panel—and thus is lower than frame based solutions. This reducing the shading effect of the surface cleaning device 100.

Figure 19:
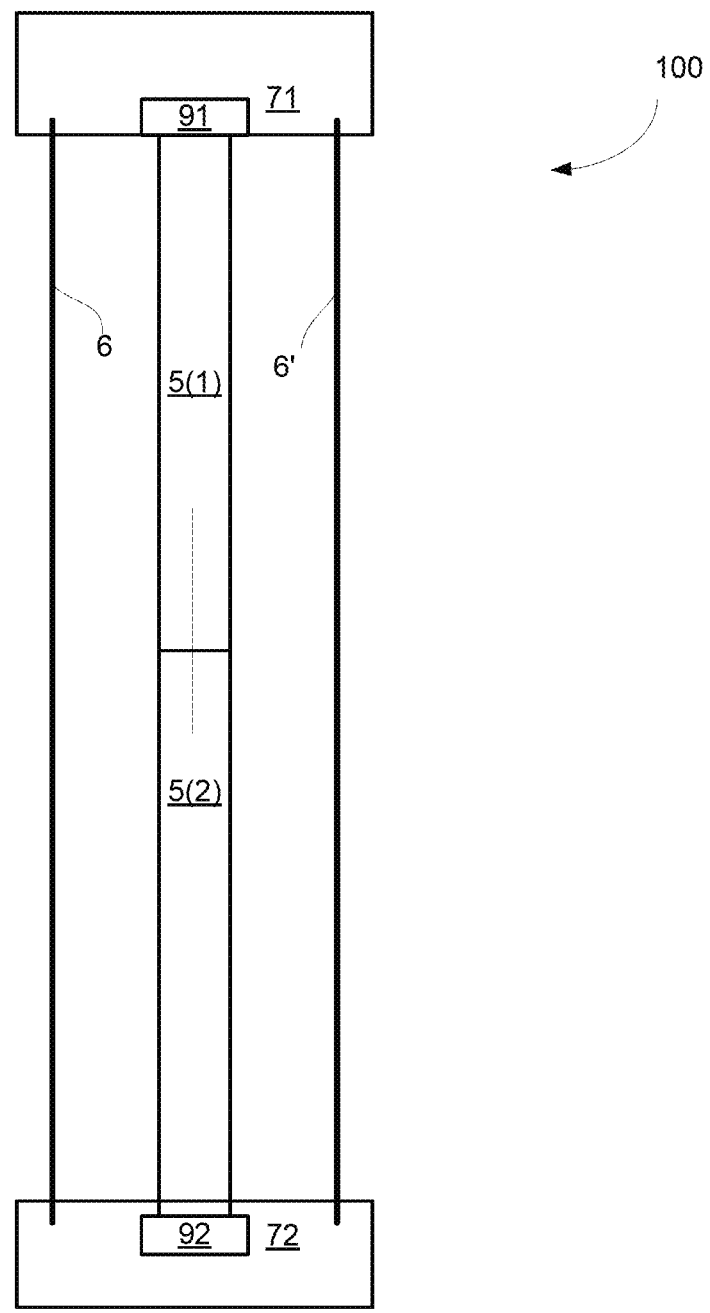
FIG. 19 illustrates an example of at least a portion of a surface cleaning device.

FIG. 19 illustrates the pivot pole as including two segments 5(1) and 5(2)—each rotated by a different engine—91 and 92 respectively. Movement mechanism unit 71 includes (or is proximate to) engine 91. Movement mechanism unit 72 includes (or is proximate to) engine 92.

It should be noted that the shaking pipes are not limiting examples of a motion delay element. A motion delay element may have a different shape than a pipe.

A motion delay element may actively catch the wiper (for example—by using clips or any gripping elements that perform a movement towards the wiper) and then release the wiper. Non-limiting examples of grabbing elements may be found in almost any robotic arm.

Figure 20:
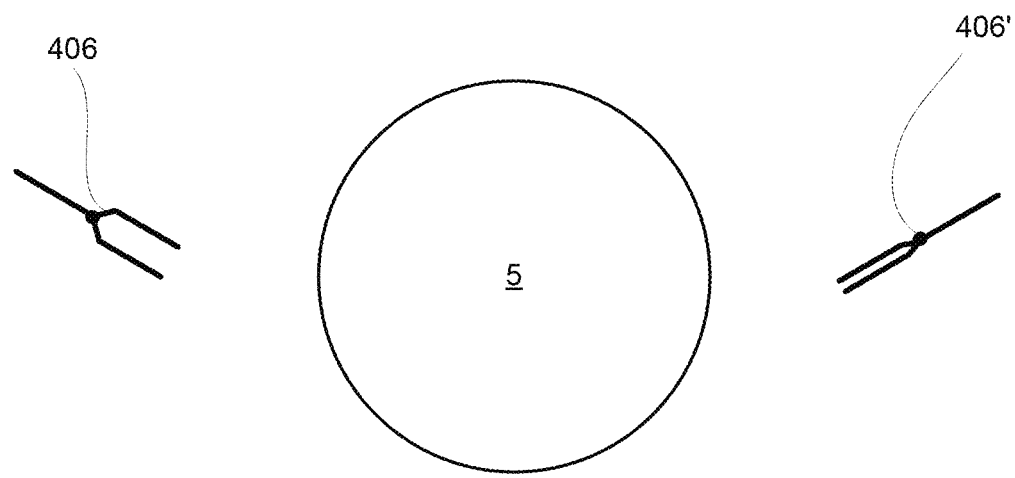
FIG. 20 illustrates an example of at least a portion of a surface cleaning device.

FIG. 20 illustrates that the motion delay elements are robotic—460 and 406' is illustrated in a closed position while robotic arm 406 is in an open position.

Figure 21:
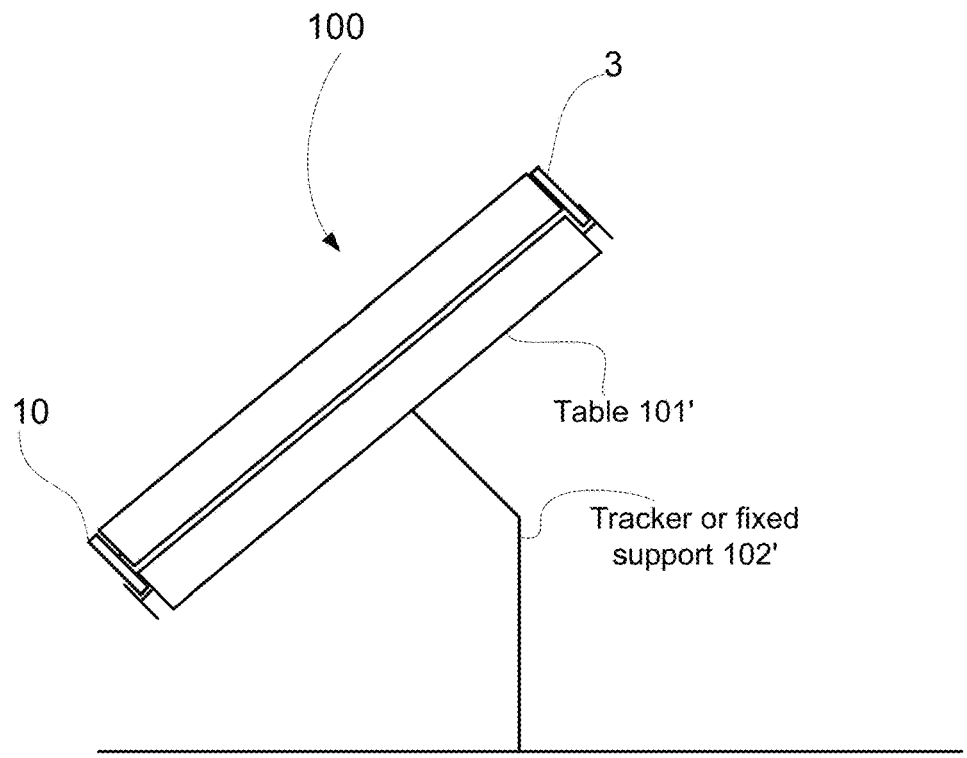
FIG. 21 illustrates an example of a table and of at least a portion of a surface cleaning device.

The surface cleaning device may include interfacing elements—such as rings, rails, protuberances, openings that may ease the holding of the surface cleaning device by a drone and/or a robotic arm and the like. FIG. 21 is a side view of the surface cleaning device 100, a table 101' and tracker or fixed support 102' that supports the table. FIG. 21 illustrates that the upper wagon 3 moves along the upper end of the table (hence "upper" wagon) while the lower wagon 10 moves along the lower end of the table (hence "lower" wagon). FIG. 22 illustrates method 500. Method 500 may include steps 510, 520 and 530. Step 510 may include moving, using a motor, a first dust carrying member and a second dust carrying member over a path.

Step 510 may include contacting the surface by the first dust carrying member while progressing at a first direction; following the contact with the surface, colliding by the first dust carrier with a shaking member thereby removing dust from the first dust carrying member; contacting the surface by the second dust carrying member while progressing at a first direction; partially blocking by the surface cleaning device, the dust removed from the first dust carrying member from progressing at a direction that is opposite to the first direction; contacting the surface by the second dust carrying member while progressing at the first direction; following the contact with the surface, colliding by the second dust carrier with the shaking member thereby removing dust from the second dust carrying member; partially blocking by the surface cleaning device, the dust removed from the second dust carrying member from progressing at the direction that is opposite to the first direction.

Method 500 may also include step 530 of moving a surface cleaning device in relation the surface.

Step 530 may be executed in parallel (with a certain overlap or in a staggered manner—even without overlap) to step 510.

Each wiper may stretch along at least a majority of the length of the pivot pipe. Alternatively, multiple wipers may be much shorter than the pivot pipe. Multiple wipers may be arranged in rows, in a staggered manner or in any ordered or non-ordered manner to cover at least a majority of the pivot pope (or any other interfacing element that contacts the wipers.

Figure 23:
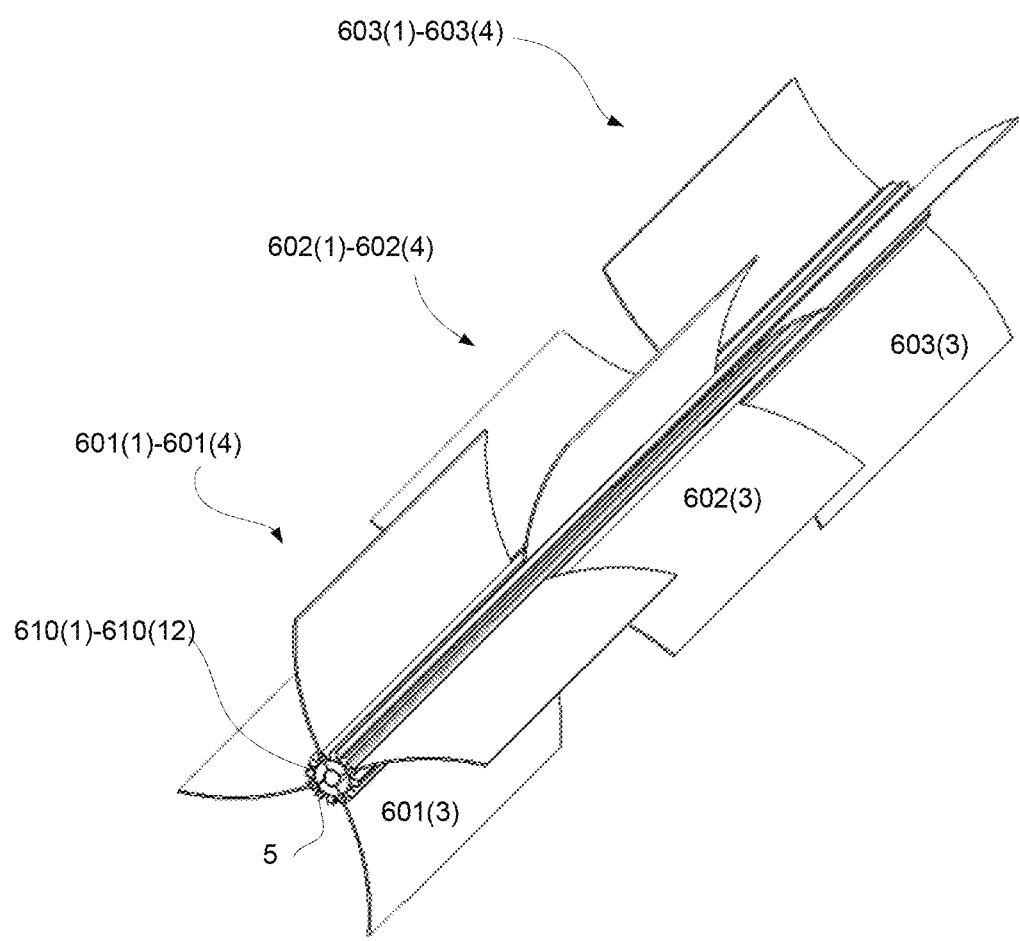
FIG. 23 illustrates an example of at least a portion of a surface cleaning device.

In FIG. 23 multiple sets of wipers are arranged in a staggered manner—multiple sets (for example—three—or any other number) different sets of wipers "cover" the length of the pivot pipe—but are positioned at different angles—so that wipers of one set of wipers (connected to the same segment of the pivot pipe) impacts the surface at different points in time than wipers of another set of wipers (connected to another segment of the pivot pipe). For example—there may be a time difference between a time of impact of each wiper of the first set and a corresponding wiper of the second set. In this sense corresponding wipers from different sets may be the wipers with the smallest timing differences between their time of impact. Corresponding wipers may be, for example, wipers 603(3), 602(3) and 601(3).

The three sets include four wiper each—601(1)-601(4), 602(1)-602(4) and 603(1)-603(4).

In FIG. 23 the different sets of wipers are phase-shifted (oriented) by 30 degrees from each other.

Figure 24:
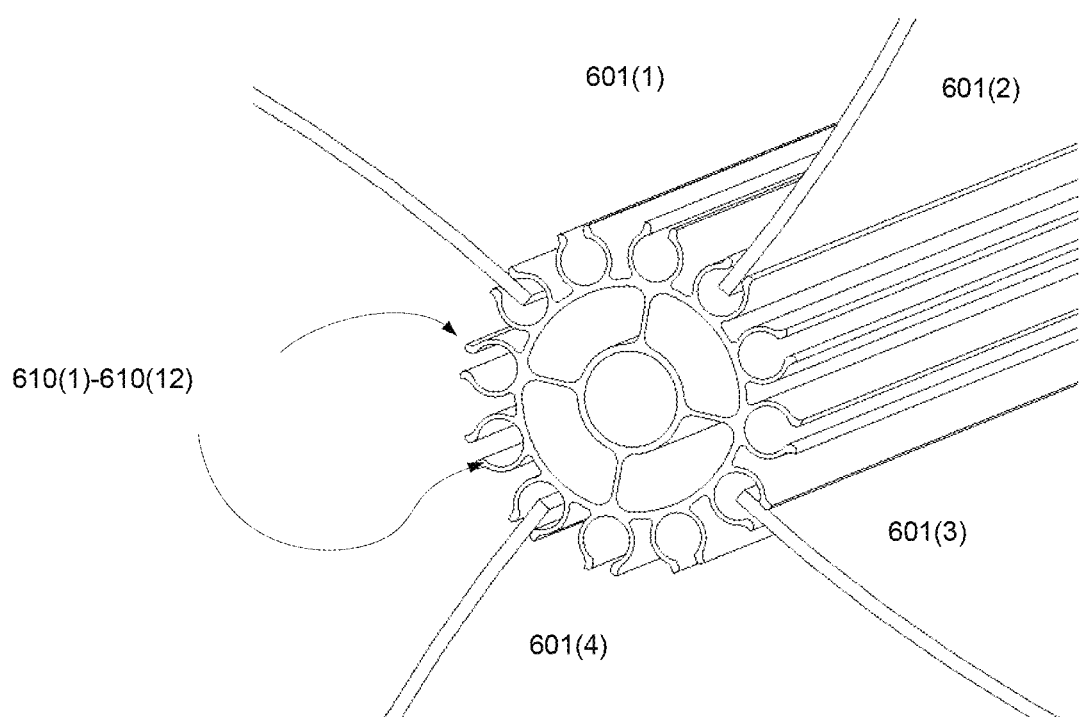
FIG. 24 illustrates an example of at least a portion of a surface cleaning device.

FIGS. 23 and 24 illustrate multiple (for example twelve—but any number may be provided) sets of wiper holders 610(1)-610(12) that are arranged in a symmetrical manner about the pivot pipe—at angular displacement of 30 degrees from each other.

This allows wipers of different sets of wipers to be arranged in angular displacements of products of 30 degrees from each other.

It is noted that the wiper holders may be arranged in an even or uneven distribution.

The staggered arrangement may reduce the forces applied on the surface.

It is noted that any arrangement of the wipers (and of the sets of wipers) may be provided. The angular displacement between different wiper holders may be the same- or may differ from each other. The widths of different wipers may be the same or differ from each other.

One or more wipers of different sets may be aligned with each other while one or more other wipers of the different sets may be misaligned with each other.

The angular displacement between the wipers of different sets of wipers may follow any pattern—staggered, non-staggered, ordered, non-ordered, random, pseudo-random—and the like.

The shaker pipe may be replaced by an air condenser that may limit and direct the air/dust distribution and thus may increase the speed of air that passes over the surface. In previous figures the space between the surface and the shaker pipe was entirely open. The condenser reduces the exit aperture to a fraction of the space between the shaker pipe and the surface.

Figure 26:
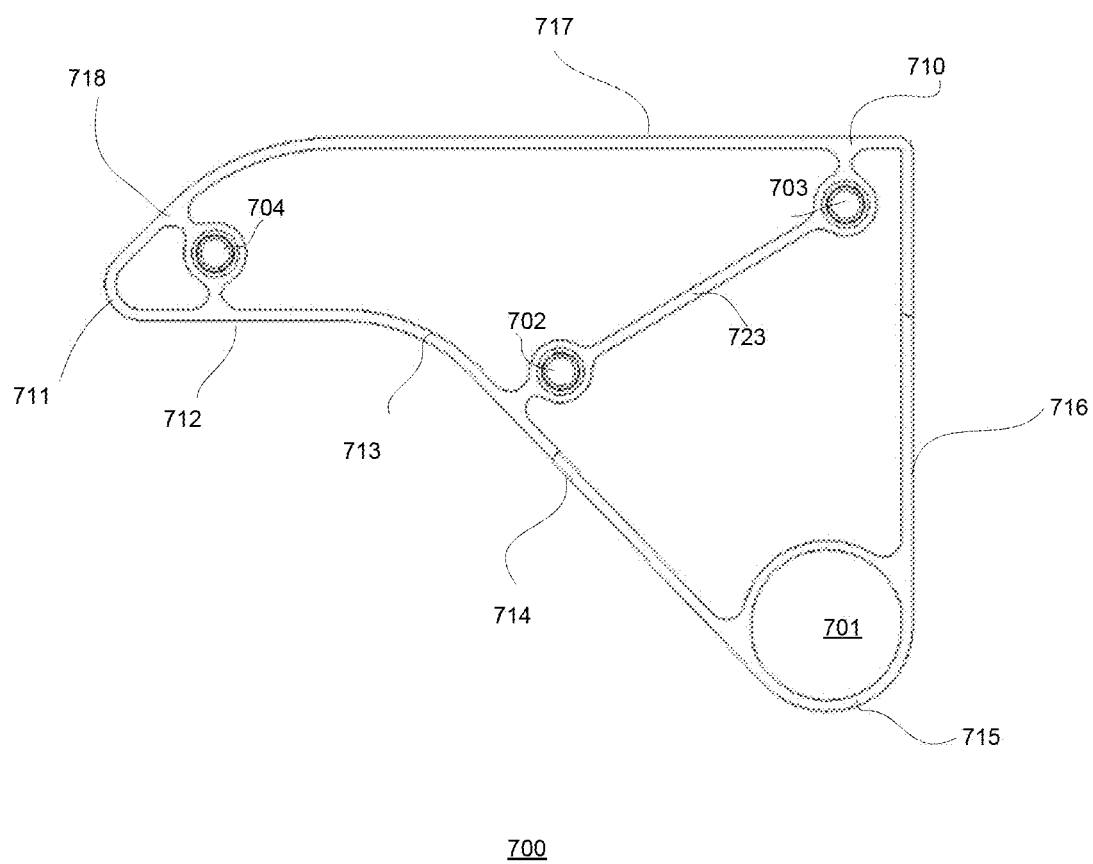
FIG. 26 illustrates an example of at least a portion of a surface cleaning device.

The condenser may have any shape or size. The cross section of the inner part of the condenser (that part the faces the dust at the time of impingement of the wiper) may be curved, convex, concave, linear, non-linear or may be any combination of linear and/or non-linear sections. In FIG. 26 the inner part is a combination of linear and non-linear parts.

Figure 25:
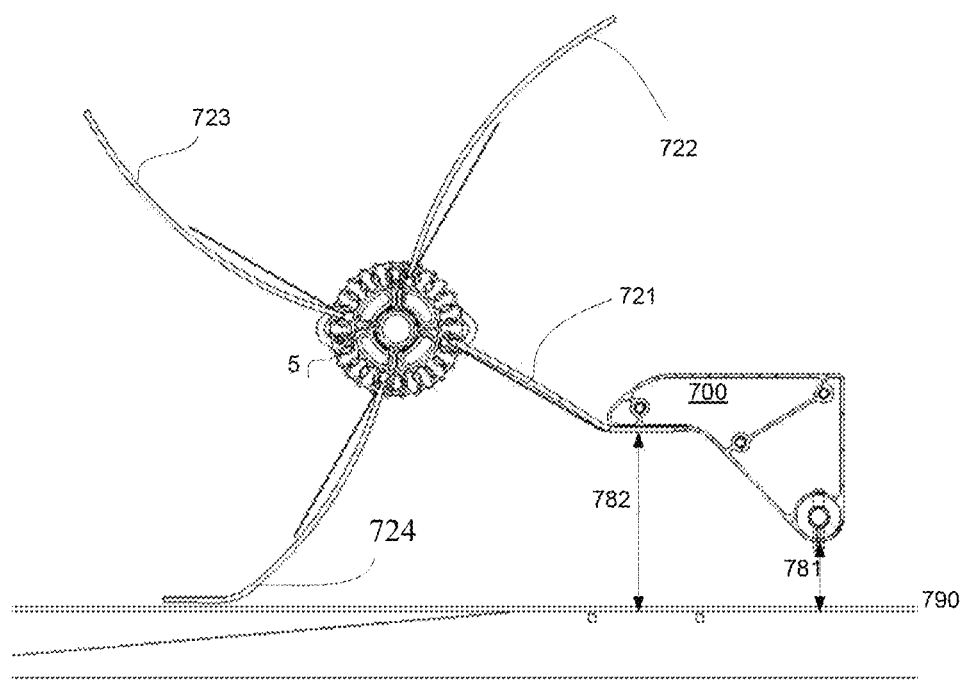
FIG. 25 illustrates an example of at least a portion of a surface cleaning device.

FIG. 25 illustrates wipers 721, 722, 723 and 724—where wiper 721 impacts the condenser 700. The wipers are rotated by pivot pipe 5. Condenser 700 and surface 790 define an output aperture 781 that is much smaller than an input aperture 782 defined between the point of impact (with the wiper) and surface 790.

FIG. 26 illustrates a cross section of condenser 700 that include supporting pipes 701, 702, 703 and 704—as well as outer housing 710 that includes sections 711-718, the inner part includes horizontal section 712, concave section 713, and sloped section 714.

Figure 27:
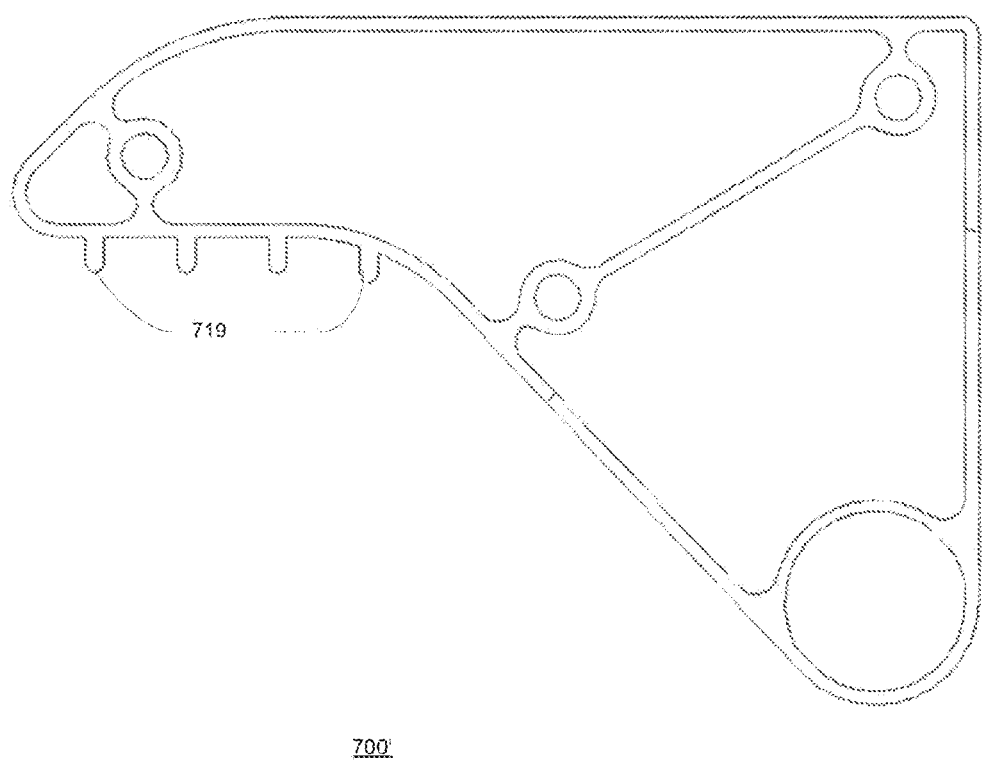
FIG. 27 illustrates an example of at least a portion of a surface cleaning device.
Figure 28:
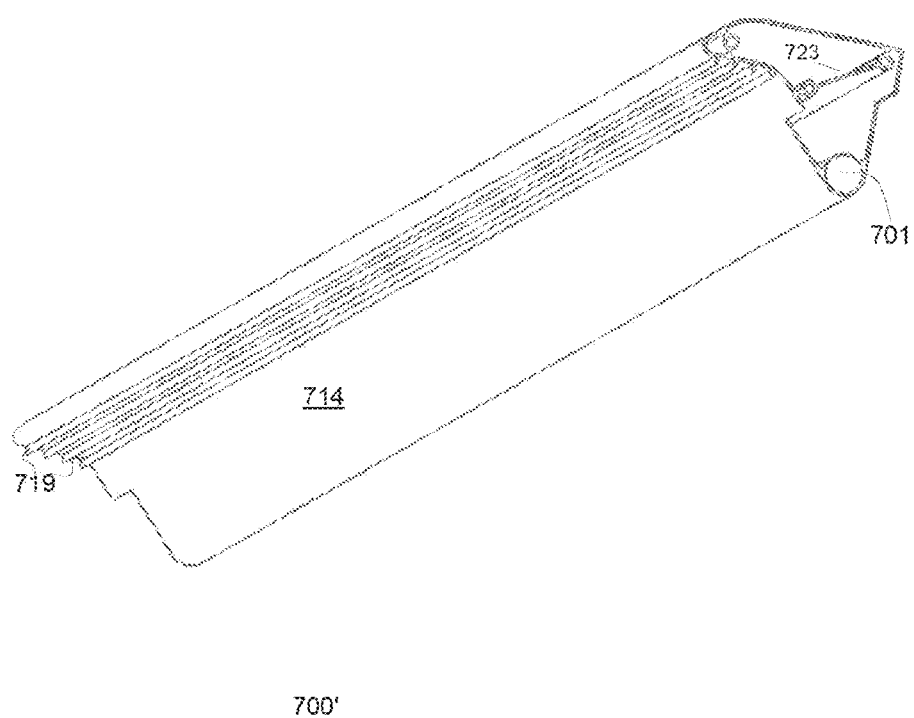
FIG. 28 illustrates an example of at least a portion of a surface cleaning device.

FIGS. 27 and 28 include a cross sectional view and a perspective view of an air condenser that differs from the air condenser of FIG. 26 by including teeth 719 that interface with the wiper and better shakes the dust from the wiper. There may be any number of teeth. The teeth may be replaced by any other protuberances/rigid surface and the like.

The wipers may be preceded by dislodging elements that are configured to contact the surface (before the surface is contacted by the wipers) and attempt to disconnect debris (such as birds dropping or mud) than can be later on can be flown away by the air from the wipers. The dislodging elements may be wipers, may be rigid or partially elastic. The dislodging elements may be non-parallel to the pivot pipe—so that they do not substantially block the air from the wipers. The dislodging elements may also be shaped and/or sized to direct air toward one or more desired direction. The combination of the dislodging elements and the wipers provide a double phase cleaning process that is efficient to clean both debris that may be connected to the surface and also to dust or other elements that are not connected to the surface. This is more efficient that using only wipers.

Figure 29:
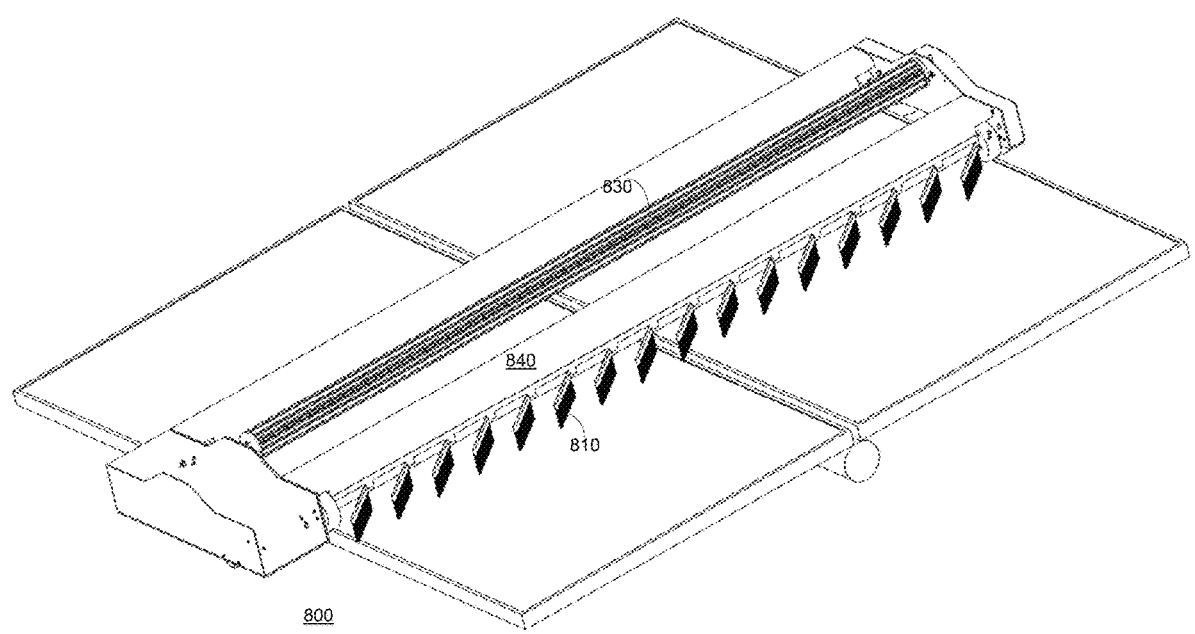
FIG. 29 illustrates an example of at least a portion of a surface cleaning device.
Figure 30:
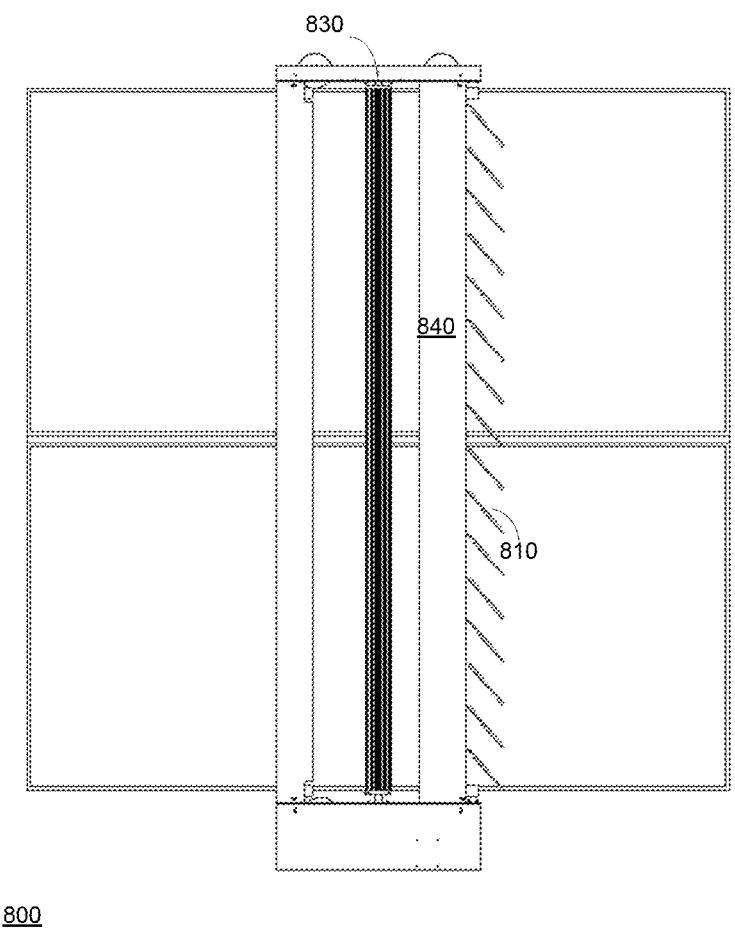
FIG. 30 illustrates an example of at least a portion of a surface cleaning device.
Figure 31:
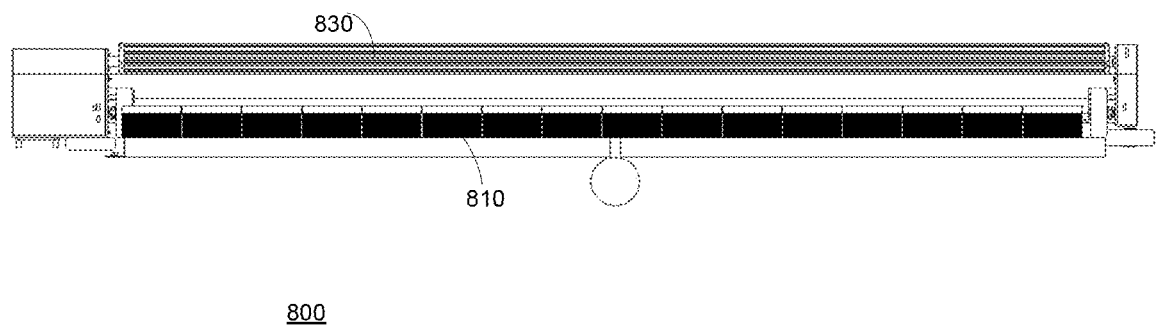
FIG. 31 illustrates an example of at least a portion of a surface cleaning device.

In FIGS. 29-31 the wipers are not shown for simplicity of explanation. Dislodging elements 810 are oriented by 45 degrees from the pivot pipe 830—although any other angle of deviation can be provided. In FIG. 29-31 the dislodging elements are connected to the air condenser 840—but any mechanical coupling of the dislodging elements to the system may be provided. The dislodging elements of FIGS. 29-31 have a rectangular shape—but may have other shapes. They may form apertured shapes—but this is not necessarily so. FIG. 29 illustrates a surface cleaning device 800 that includes the dislodging elements.

The system may move in two directions—but the dislodging elements may be positioned on only one side of the system—or on both sides of the system. The shape, size and number of dislodging elements may differ from those illustrated in FIGS. 29-31.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between blocks are merely illustrative and that alternative embodiments may merge blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A surface cleaning device for cleaning a surface of a solar panel, wherein the surface cleaning device comprises:
    a first dust carrying member;
    a second dust carrying member;
    a motor; and
    a motion delay assembly;
    wherein the first dust carrying member and the second dust carrying member are coupled to the motor;
    wherein the motor is configured to cyclically move the first dust carrying member and the second dust carrying member along a path;
    wherein the motion delay assembly is configured to cyclically introduce a momentarily delay in a progress of the first dust carrying member along the path, while the second dust carrying member contacts the surface thereby reducing a gap between the first dust carrying member and the second dust carrying member and induce air to exit the gap and progress along the surface and remove dust that precedes the second dust carrying member
    wherein surface cleaning device is configured to position the motion delay assembly at a first position when the surface cleaning device propagates towards one end of the surface and is configured to position the motion delay assembly at a second position when the surface cleaning device propagates towards another end of the surface;
    wherein when positioned in the first position the motion delay assembly is within a reach of the first dust carrying member; and
    wherein when positioned at the second position the motion delay assembly is outside the reach of the first dust carrying member.

2. The surface cleaning device according to claim 1 wherein the second dust carrying member, when contacting the surface, is configured to at least partially prevent an exit of the air from the gap towards dust that resides on the surface and follows the second dust carrying member.

3. The surface cleaning device according to claim 1 wherein the motion delay assembly is configured to induce the air to exit the gap at a first direction; wherein the second dust carrying member contacts the surface while progressing along the first direction.

4. The surface cleaning device according to claim 1 wherein during a single cycle the first dust carrying member is configured to contact the surface at a first point in time and wherein the motion delay assembly is configured to introduce the momentarily delay at a second point of time that follows the first point of time.

5. The surface cleaning device according to claim 1 wherein the momentary delay is of a first duration; wherein the first duration exceeds a duration of a delay imposed on a progress of the second dust carrying member due to a contact between the surface and the second dust carrying member.

6. The surface cleaning device according to claim 1 wherein the motion delay assembly is configured to cyclically introduce the momentarily delay in the progress of the first dust carrying member without substantially delaying a progress of the second dust carrying member along the path.

7. The surface cleaning device according to claim 1 wherein the motion delay assembly is further configured to remove dust from the first dust carrying member while introducing the momentarily delay.

8. The surface cleaning device according to claim 1 wherein the motion delay assembly is configured to cyclically introduce a momentarily delay in a progress of the second dust carrying member along the path, while the first dust carrying member contacts the surface, thereby reducing the gap between the first dust carrying member and the second dust carrying member and inducing air to exit the gap and progress along the surface and remove dust that precedes the first dust carrying member.

9. The surface cleaning device according to claim 1 wherein the motor is configured to cyclically move the first dust carrying member and the second dust carrying member along the path by rotating the first dust carrying member and the second dust carrying member about an axis of rotation.

10. The surface cleaning device according to claim 1 wherein the motion delay assembly comprises: a first motion delay element that is positioned at a first side of the motion delay assembly; a second motion delay element that is positioned at a second side of the motion delay assembly; and a manipulator that is configured to selectively position at least one of the first and second motion delay elements within the path of the first dust carrying member.

11. The surface cleaning device according to claim 1 wherein the motion delay assembly comprises a first motion delay element that is positioned at a first side of the motion delay assembly, a second motion delay element that is positioned at a second side of the motion delay assembly and a manipulator that is configured to position the first motion delay element within the path of the first dust carrying member when the surface cleaning device propagates towards an end of the surface and to position the second motion delay element within the path of the first dust carrying member when the surface cleaning device propagates towards another end of the surface.

12. The surface cleaning device according to claim 1 comprising a group of dust carrying members, wherein the dust carrying members comprises the first and second dust carrying members and at least one additional dust carrying member.

13. The surface cleaning device according to claim 1 comprising at least one environment sensor that is configured to sense at least one environmental condition.

14. The surface cleaning device according to claim 13 comprising a controller that is configured to control the operation of the surface cleaning device based on one or more environmental conditions of the at least one environmental condition.

15. The surface cleaning device according to claim 1 comprising at least one battery for providing electrical energy for powering the surface cleaning device.

16. The surface cleaning device according to claim 1 consisting essentially of the motor, the
    motion delay assembly and a group of dust carrying members, wherein the group of the dust carrying members comprises the first and second dust carrying members.

17. The surface cleaning device according to claim 1, further comprising at least one dislodging element that precedes the first dust carrying member and the second dust carrying member, and is configured to contact the surface and disconnect debris from the surface; and wherein the surface cleaning device is further configured to induce the air to exit the gap and progress along the surface and also remove the debris.

18. The surface cleaning device according to claim 17, wherein the at least one dislodging element is neither parallel and neither perpendicular to an axis of rotation of the motor.

19. The surface cleaning device according to claim 17, wherein the at least one dislodging element comprises multiple plates.

20. The surface cleaning device according to claim 17, wherein the at least one dislodging element is made of a rigid material.

21. The surface cleaning device according to claim 17 wherein the at least one dislodging element comprises multiple plates that are shaped and positioned to divert a progress of the air.

22. The surface cleaning device according to claim 21 wherein the air condenser is configured to increase a speed of air exited from the air condenser.

23. The surface cleaning device according to claim 21 wherein a distance between the surface and a lower end of the air condenser is a fraction of a height difference between the surface and a point of contact between the second dust carrying member.

24. The surface cleaning device according to claim 21 wherein the air condenser comprises teeth that are positioned at an area of the air condenser that is in contact with the dust carrier members.

25. The surface cleaning device according to claim 1 wherein the motion delay assembly comprises an air condenser.

26. The surface cleaning device according to claim 1 comprising multiple spaced apart sets of dust carrier members, wherein the sets of dust carrier members comprise the first and second dust carrier members.

27. The surface cleaning device according to claim 1 comprising multiple staggered sets of dust carrier members, wherein the sets of dust carrier members comprise the first and second dust carrier members.

28. The surface cleaning device according to claim 1 wherein each dust carrier member is flexible.

29. A surface cleaning device for cleaning a surface of a solar panel, wherein the surface cleaning that comprises:
   a first dust carrying member;
   a second dust carrying member;
   a motor; and
   a shaking member;
   wherein the first dust carrying member and the second dust carrying member are coupled to the motor;
   wherein the motor is configured to cyclically move the first dust carrying member and the second dust carrying member along a path;
   wherein the first dust carrying member is configured to (a) contact the surface while progressing at a first direction, and following the contact with the surface (b), collide with the shaking member thereby removing dust from the first dust carrying member; and
   wherein the surface cleaning device is configured to at least partially block the dust removed from the first dust carrying member to progress at a direction that is opposite to the first direction.

30. The surface cleaning device according to claim 29 wherein the a first dust carrying member and the second dust carrying member are wipers.

31. The surface cleaning device according to claim 29 wherein the a first dust carrying member and the second dust carrying member are wipers that comprises microfiber fibers.

32. The surface cleaning device according to claim 29 comprising an additional shaking element, wherein the first dust carrying member is configured to (a) contact the surface while progressing at a second direction that differs from from the first direction, and following the contact with the surface (b), collide with the additional shaking member thereby removing dust from the first dust carrying member; and wherein the surface cleaning device is configured to at least partially block the dust removed from the first dust carrying member to progress at a direction that is opposite to the second direction.

33. A method of cleaning a surface, comprising:
   moving, using a motor, a first dust carrying member and a second dust carrying member over the surface, where the first and second dust carrying members are mechanically coupled to a motor such that when the motor is activated the motion of the first and second dust carrying members are configured to perform at least one out of collecting dust and pushing dust primarily in a first direction;
   momentarily delaying, by a motion delay assembly, a motion of the first dust carrying member approximately at a point where the first dust carrying member lifts above the surface, and the second dust carrying member is at point where it is configured to at least partially block air passage in a second direction generally opposite to its current direction of movement relative to the surface, while air passage is in the direction of the first dust carrying member is less impeded;
   positioning the motion delay assembly at a first position when the surface cleaning device propagates towards one end of the surface;
   positioning the motion delay assembly at a second position when the surface cleaning device propagates towards another end of the surface;
   wherein when positioned in the first position the motion delay assembly is within a reach of the first dust carrying member; and
   wherein when positioned at the second position the motion delay assembly is outside the reach of the first dust carrying member.

* * * * *